(12) United States Patent
Kodama

(10) Patent No.: US 11,433,715 B2
(45) Date of Patent: *Sep. 6, 2022

(54) PNEUMATIC TIRE

(71) Applicant: The Yokohama Rubber Co., LTD., Tokyo (JP)

(72) Inventor: Yuji Kodama, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 232 days.

This patent is subject to a terminal disclaimer.

(21) Appl. No.: 16/315,604

(22) PCT Filed: Jul. 6, 2017

(86) PCT No.: PCT/JP2017/024848
§ 371 (c)(1),
(2) Date: Jan. 4, 2019

(87) PCT Pub. No.: WO2018/008726
PCT Pub. Date: Jan. 11, 2018

(65) Prior Publication Data
US 2019/0184764 A1    Jun. 20, 2019

(30) Foreign Application Priority Data

Jul. 6, 2016  (JP) .............................. JP2016-133821

(51) Int. Cl.
*B60C 13/02* (2006.01)
*B60C 5/00* (2006.01)
*B60C 13/00* (2006.01)

(52) U.S. Cl.
CPC ................ *B60C 13/02* (2013.01); *B60C 5/00* (2013.01); *B60C 13/00* (2013.01)

(58) Field of Classification Search
CPC ..... B60C 13/00; B60C 13/001; B60C 13/002; B60C 13/02; B60C 13/023
See application file for complete search history.

(56) References Cited

U.S. PATENT DOCUMENTS 3,568,747 A * 3/1971 Fletcher ................ B60C 11/01
152/154
2013/0014877 A1    1/2013 Ahn et al.
(Continued)

FOREIGN PATENT DOCUMENTS

GB    1509948    * 5/1978
JP    8-258518   * 10/1996
(Continued)

OTHER PUBLICATIONS

Machine translation of JP 2010-36598, 2010.*
(Continued)

*Primary Examiner* — Justin R Fischer
(74) *Attorney, Agent, or Firm* — Thorpe North & Western

(57) ABSTRACT

A pneumatic tire includes a plurality of protrusion portions extending along a tire side surface of a tire side portion in a direction that intersects a tire circumferential direction and a tire radial direction; the plurality of protrusion portions each including an intermediate portion in an extension direction that includes a highest position of projection height from the tire side surface, and an end portion on either side of the intermediate portion in the extension direction that includes a lowest position of projection height from the tire side surface. The highest position of projection height of the intermediate portion is in a range of 20% of a tire cross-sectional height from a tire maximum width position to an inner side and an outer side in the tire radial direction, and a ratio of a total width SW and an outer diameter OD satisfies a relationship of SW/OD≤0.3.

25 Claims, 41 Drawing Sheets

(56) References Cited

U.S. PATENT DOCUMENTS

| | | | |
|---|---|---|---|
| 2013/0042953 A1 | 2/2013 | Kuwayama | |
| 2013/0075006 A1* | 3/2013 | Kojima | ............... B60C 13/02 |
| | | | 152/523 |
| 2015/0136292 A1 | 5/2015 | Kodama et al. | |

FOREIGN PATENT DOCUMENTS

| | | | |
|---|---|---|---|
| JP | 2001-039129 | | 2/2001 |
| JP | 2004-291938 | * | 10/2004 |
| JP | 2008-279900 | | 11/2008 |
| JP | 2010-36598 | * | 2/2010 |
| JP | 2013-018474 | | 1/2013 |
| JP | 2013-071669 | | 4/2013 |
| JP | 5246370 | | 7/2013 |
| JP | 2015-040030 | | 3/2015 |
| JP | 2015-212117 | | 11/2015 |
| WO | WO 80/00236 | * | 2/1980 |
| WO | WO 2011/135774 | | 11/2011 |
| WO | WO 2014/030391 | | 2/2014 |

OTHER PUBLICATIONS

Machine translation of JP 2004-291938, 2004.*
International search Report for International Application No. PCT/JP2017/024848 dated Aug. 8, 2017, 4 pages, Japan.

* cited by examiner

| ASPECT RATIO | K1 |
|---|---|
| 20-25 | 0.92 |
| 30-40 | 0.90 |
| 45 | 0.85 |
| 50-55 | 0.80 |
| 60-70 | 0.75 |
| 75-95 | 0.70 |

FIG. 3

| NOMINAL RIM WIDTH | Rm (mm) |
|---|---|
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

FIG. 4

| | CONVENTIONAL EXAMPLE | COMPARATIVE EXAMPLE 1 | COMPARATIVE EXAMPLE 2 | EXAMPLE 1 | EXAMPLE 2 |
|---|---|---|---|---|---|
| NOMINAL WIDTH (TOTAL WIDTH) SW | 205 | 155 | 205 | 155 | 155 |
| ASPECT RATIO | 55 | 55 | 55 | 55 | 55 |
| INNER DIAMETER | 16 | 20 | 16 | 20 | 20 |
| OUTER DIAMETER OD | 620 | 645 | 620 | 645 | 645 |
| SW/OD | 0.33 | 0.24 | 0.33 | 0.24 | 0.24 |
| PROTRUSION PORTION ARRANGEMENT | FIG. 39 | FIG. 39 | FIG. 5 | FIG. 5 | FIG. 5 |
| THE HIGHEST POSITION OF THE PROJECTION HEIGHT OF INTERMEDIATE PORTION IS IN A RANGE OF 10% OF THE TIRE CROSS-SECTIONAL HEIGHT FROM THE TIRE MAXIMUM WIDTH POSITION TO THE INNER SIDE AND THE OUTER SIDE IN THE TIRE RADIAL DIRECTION. | - | - | - | - | - |
| INTERMEDIATE PORTION PROJECTION HEIGHT (mm) | 12 | 12 | 12 | 12 | 10 |
| PROJECTION HEIGHT OF PROTRUSION PORTION PER 1 DEGREE IN THE TIRE CIRCUMFERENTIAL DIRECTION (mm) | - | - | 1.2 | 1.5 | 1.5 |
| MASS OF PROTRUSION PORTION PER 1 DEGREE IN THE TIRE CIRCUMFERENTIAL DIRECTION (g) | - | - | 0.3 | 0.3 | 0.3 |
| ANGLE OF PROTRUSION PORTION WITH RESPECT TO THE TIRE RADIAL DIRECTION WITH THE END ON THE INNER SIDE IN THE TIRE RADIAL DIRECTION AS A REFERENCE POINT ON THE OUTER SIDE IN THE TIRE RADIAL DIRECTION (°) | 0 | 0 | 50 | 50 | 50 |
| GROOVE IN SURFACE OF PROTRUSION PORTION? | - | - | - | - | - |
| RECESSED PORTION IN SURFACE OF PROTRUSION PORTION? | - | - | - | - | - |
| INTERVAL OF PROTRUSION PORTIONS IN THE TIRE CIRCUMFERENTIAL DIRECTION | UNIFORM | UNIFORM | UNIFORM | UNIFORM | UNIFORM |
| POSITION WHEN TIRE IS MOUNTED ON VEHICLE | VEHICLE OUTER SIDE | VEHICLE OUTER SIDE | VEHICLE OUTER SIDE | VEHICLE OUTER SIDE | VEHICLE OUTER SIDE |
| PASS-BY NOISE REDUCING PERFORMANCE | 100 | 100 | 101 | 101 | 101 |
| LIFT REDUCING PERFORMANCE | 100 | 100 | 100 | 100 | 100 |
| AIR RESISTANCE REDUCING PERFORMANCE | 100 | 105 | 100 | 105 | 105 |
| UNIFORMITY | 100 | 100 | 100 | 100 | 100 |
| PROTRUSION PORTION DURABILITY PERFORMANCE | 100 | 100 | 100 | 100 | 100 |
| RIDE COMFORT PERFORMANCE | 100 | 100 | 100 | 100 | 100 |

FIG. 37A

| | EXAMPLE 3 | EXAMPLE 4 | EXAMPLE 5 | EXAMPLE 6 | EXAMPLE 7 |
|---|---|---|---|---|---|
| NOMINAL WIDTH (TOTAL WIDTH) SW | 155 | 155 | 155 | 155 | 155 |
| ASPECT RATIO | 55 | 55 | 55 | 55 | 55 |
| INNER DIAMETER | 20 | 20 | 20 | 20 | 20 |
| OUTER DIAMETER OD | 645 | 645 | 645 | 645 | 645 |
| SW/OD | 0.24 | 0.24 | 0.24 | 0.24 | 0.24 |
| PROTRUSION PORTION ARRANGEMENT | FIG. 5 | FIG. 5 | FIG. 5 | FIG. 5 | FIG. 5 |
| THE HIGHEST POSITION OF THE PROJECTION HEIGHT OF INTERMEDIATE PORTION IS IN A RANGE OF 10% OF THE TIRE CROSS-SECTIONAL HEIGHT FROM THE TIRE MAXIMUM WIDTH POSITION TO THE INNER SIDE AND THE OUTER SIDE IN THE TIRE RADIAL DIRECTION. | SATISFIED | SATISFIED | SATISFIED | SATISFIED | SATISFIED |
| INTERMEDIATE PORTION PROJECTION HEIGHT (mm) | 10 | 2 | 5 | 5 | 5 |
| PROJECTION HEIGHT OF PROTRUSION PORTION PER 1 DEGREE IN THE TIRE CIRCUMFERENTIAL DIRECTION (mm) | 1.5 | 1.5 | 1.0 | 1.0 | 1.0 |
| MASS OF PROTRUSION PORTION PER 1 DEGREE IN THE TIRE CIRCUMFERENTIAL DIRECTION (g) | 0.3 | 0.3 | 0.1 | 0.1 | 0.1 |
| ANGLE OF PROTRUSION PORTION WITH RESPECT TO THE TIRE RADIAL DIRECTION WITH THE END ON THE INNER SIDE IN THE TIRE RADIAL DIRECTION AS A REFERENCE POINT ON THE OUTER SIDE IN THE TIRE RADIAL DIRECTION (°) | 50 | 50 | 50 | 50 | 50 |
| GROOVE IN SURFACE OF PROTRUSION PORTION? | - | - | - | YES | - |
| RECESSED PORTION IN SURFACE OF PROTRUSION PORTION? | - | - | - | - | YES |
| INTERVAL OF PROTRUSION PORTIONS IN THE TIRE CIRCUMFERENTIAL DIRECTION | UNIFORM | UNIFORM | UNIFORM | UNIFORM | UNIFORM |
| POSITION WHEN TIRE IS MOUNTED ON VEHICLE | VEHICLE OUTER SIDE | VEHICLE OUTER SIDE | VEHICLE OUTER SIDE | VEHICLE OUTER SIDE | VEHICLE OUTER SIDE |
| PASS-BY NOISE REDUCING PERFORMANCE | 102 | 102 | 102 | 102 | 102 |
| LIFT REDUCING PERFORMANCE | 105 | 102 | 103 | 103 | 103 |
| AIR RESISTANCE REDUCING PERFORMANCE | 105 | 105 | 105 | 105 | 105 |
| UNIFORMITY | 100 | 100 | 101 | 101 | 101 |
| PROTRUSION PORTION DURABILITY PERFORMANCE | 100 | 100 | 100 | 101 | 101 |
| RIDE COMFORT PERFORMANCE | 100 | 100 | 100 | 101 | 101 |

FIG. 37B

| | EXAMPLE 8 | EXAMPLE 9 | EXAMPLE 10 | EXAMPLE 11 | EXAMPLE 12 |
|---|---|---|---|---|---|
| NOMINAL WIDTH (TOTAL WIDTH) SW | 155 | 155 | 155 | 155 | 155 |
| ASPECT RATIO | 55 | 55 | 55 | 55 | 55 |
| INNER DIAMETER | 20 | 20 | 20 | 20 | 20 |
| OUTER DIAMETER OD | 645 | 645 | 645 | 645 | 645 |
| SW/OD | 0.24 | 0.24 | 0.24 | 0.24 | 0.24 |
| PROTRUSION PORTION ARRANGEMENT | FIG. 5 | FIG. 5 | FIG. 5 | FIG. 5 | FIG. 5 |
| THE HIGHEST POSITION OF THE PROJECTION HEIGHT OF INTERMEDIATE PORTION IS IN A RANGE OF 10% OF THE TIRE CROSS-SECTIONAL HEIGHT FROM THE TIRE MAXIMUM WIDTH POSITION TO THE INNER SIDE AND THE OUTER SIDE IN TIRE RADIAL DIRECTION. | SATISFIED | SATISFIED | SATISFIED | SATISFIED | SATISFIED |
| INTERMEDIATE PORTION PROJECTION HEIGHT (mm) | 5 | 5 | 5 | 5 | 5 |
| PROJECTION HEIGHT OF PROTRUSION PORTION PER 1 DEGREE IN THE TIRE CIRCUMFERENTIAL DIRECTION (mm) | 1.0 | 1.0 | 1.0 | 1.0 | 1.0 |
| MASS OF PROTRUSION PORTION PER 1 DEGREE IN THE TIRE CIRCUMFERENTIAL DIRECTION (g) | 0.1 | 0.1 | 0.1 | 0.1 | 0.1 |
| ANGLE OF PROTRUSION PORTION WITH RESPECT TO THE TIRE RADIAL DIRECTION WITH THE END ON THE INNER SIDE IN THE TIRE RADIAL DIRECTION AS A REFERENCE POINT ON THE OUTER SIDE IN THE TIRE RADIAL DIRECTION (°) | 50 | 10 | 15 | 85 | 90 |
| GROOVE IN SURFACE OF PROTRUSION PORTION? | YES | YES | YES | YES | YES |
| RECESSED PORTION IN SURFACE OF PROTRUSION PORTION? | YES | YES | YES | YES | YES |
| INTERVAL OF PROTRUSION PORTIONS IN THE TIRE CIRCUMFERENTIAL DIRECTION | UNIFORM | UNIFORM | UNIFORM | UNIFORM | UNIFORM |
| POSITION WHEN TIRE IS MOUNTED ON VEHICLE | VEHICLE OUTER SIDE | VEHICLE OUTER SIDE | VEHICLE OUTER SIDE | VEHICLE OUTER SIDE | VEHICLE OUTER SIDE |
| PASS-BY NOISE REDUCING PERFORMANCE | 102 | 102 | 102 | 102 | 102 |
| LIFT REDUCING PERFORMANCE | 103 | 103 | 103 | 103 | 103 |
| AIR RESISTANCE REDUCING PERFORMANCE | 105 | 105 | 105 | 105 | 103 |
| UNIFORMITY | 102 | 102 | 102 | 102 | 102 |
| PROTRUSION PORTION DURABILITY PERFORMANCE | 102 | 102 | 102 | 102 | 102 |
| RIDE COMFORT PERFORMANCE | 102 | 102 | 102 | 102 | 102 |

FIG. 38A

|  | EXAMPLE 13 | EXAMPLE 14 | EXAMPLE 15 | EXAMPLE 16 |
|---|---|---|---|---|
| NOMINAL WIDTH (TOTAL WIDTH) SW | 155 | 155 | 155 | 155 |
| ASPECT RATIO | 55 | 55 | 55 | 55 |
| INNER DIAMETER | 20 | 20 | 20 | 20 |
| OUTER DIAMETER OD | 645 | 645 | 645 | 645 |
| SW/OD | 0.24 | 0.24 | 0.24 | 0.24 |
| PROTRUSION PORTION ARRANGEMENT | FIG. 5 | FIG. 5 | FIG. 5 | FIG. 10 |
| THE HIGHEST POSITION OF THE PROJECTION HEIGHT OF INTERMEDIATE PORTION IS IN A RANGE OF 10% OF THE TIRE CROSS-SECTIONAL HEIGHT FROM THE TIRE MAXIMUM WIDTH POSITION TO THE INNER SIDE AND THE OUTER SIDE IN TIRE RADIAL DIRECTION. | SATISFIED | SATISFIED | SATISFIED | SATISFIED |
| INTERMEDIATE PORTION PROJECTION HEIGHT (mm) | 5 | 5 | 5 | 5 |
| PROJECTION HEIGHT OF PROTRUSION PORTION PER 1 DEGREE IN THE TIRE CIRCUMFERENTIAL DIRECTION (mm) | 1.0 | 1.0 | 1.0 | 1.0 |
| MASS OF PROTRUSION PORTION PER 1 DEGREE IN THE TIRE CIRCUMFERENTIAL DIRECTION (g) | 0.1 | 0.1 | 0.1 | 0.1 |
| ANGLE OF PROTRUSION PORTION WITH RESPECT TO THE TIRE RADIAL DIRECTION WITH THE END ON THE INNER SIDE IN THE TIRE RADIAL DIRECTION AS A REFERENCE POINT ON THE OUTER SIDE IN THE TIRE RADIAL DIRECTION (°) | 50 | 50 | 50 | 50 |
| GROOVE IN SURFACE OF PROTRUSION PORTION? | YES | YES | YES | YES |
| RECESSED PORTION IN SURFACE OF PROTRUSION PORTION? | YES | YES | YES | YES |
| INTERVAL OF PROTRUSION PORTIONS IN THE TIRE CIRCUMFERENTIAL DIRECTION | NON-UNIFORM | NON-UNIFORM | NON-UNIFORM | NON-UNIFORM |
| POSITION WHEN TIRE IS MOUNTED ON VEHICLE | VEHICLE OUTER SIDE | VEHICLE INNER SIDE | VEHICLE OUTER SIDE VEHICLE INNER SIDE | VEHICLE OUTER SIDE |
| PASS-BY NOISE REDUCING PERFORMANCE | 103 | 101 | 103 | 104 |
| LIFT REDUCING PERFORMANCE | 103 | 101 | 102 | 103 |
| AIR RESISTANCE REDUCING PERFORMANCE | 105 | 105 | 105 | 105 |
| UNIFORMITY | 102 | 102 | 102 | 102 |
| PROTRUSION PORTION DURABILITY PERFORMANCE | 102 | 102 | 102 | 102 |
| RIDE COMFORT PERFORMANCE | 102 | 102 | 102 | 102 |

FIG. 38B

PNEUMATIC TIRE

TECHNICAL FIELD

The present technology relates to a pneumatic tire.

BACKGROUND ART

Hitherto, for example, in Japan Patent No. 5246370, there is disclosed a pneumatic tire to be disposed in a tire housing of a vehicle. The pneumatic tire includes a plurality of protrusion portions that is disposed at intervals in a tire circumferential direction on at least one tire side portion, and that extends in an elongated manner between an inner side and an outer side in a tire radial direction including a tire maximum width position. An extension direction of each of the protrusion portions is inclined with respect to the tire radial direction, and the protrusion portions adjacent to each other in the tire circumferential direction are disposed with mutually opposite orientation and inclined with respect to the tire radial direction. The number of the protrusion portions disposed in the tire circumferential direction falls within a range of from 10 to 50. In Japan Patent No. 5246370, it is disclosed that the air resistance reduction effect of the vehicle is maintained and the uniformity is improved.

Further, in Japan Unexamined Patent Publication No. 2013-18474, there is disclosed a vehicle tire that includes sidewalls on which curved projection portions are formed. In Japan Unexamined Patent Publication No. 2013-18474, the following matter is described. That is, the air flow against the sidewall does not naturally pass along the sidewall. Instead, the air moves inside a wheel housing of the vehicle, thereby generating a downforce that presses down an upper end of a tread portion of the tire.

Note that hitherto, in International Patent Publication No. WO 2011/0135774, there is disclosed a method of reducing the air resistance around the tire by decreasing the total width of the pneumatic tire and decreasing the front projected area (projected area as viewed from the rolling direction of the pneumatic tire).

SUMMARY

It is known that an air resistance reduction effect of a vehicle can be obtained by providing protrusion portions on tire side portions. In addition, as a result of further research conducted by the inventors, the following matters are understood. That is, turbulence of air flow is caused by rolling of a pneumatic tire, and hence fluctuation of air pressure becomes significant on side surfaces of the vehicle. As a result, a sound is generated, and pass-by noise being vehicle external noise becomes excessively large. Thus, it is found that the vehicle external noise can be reduced by the protrusion portions on the tire side portions.

With the foregoing in view, the present technology provides a pneumatic tire that can reduce pass-by noise and air resistance.

A pneumatic tire according to an aspect of the present technology includes a plurality of protrusion portions extending along a tire side surface of a tire side portion in a direction that intersects a tire circumferential direction and a tire radial direction; the plurality of protrusion portions each including an intermediate portion in an extension direction that includes a highest position of projection height from the tire side surface, and an end portion on either side of the intermediate portion in the extension direction that includes a lowest position of projection height from the tire side surface. The highest position of projection height of the intermediate portion is in a range of 20% of a tire cross-sectional height from a tire maximum width position to an inner side and an outer side in the tire radial direction, and a ratio of a total width SW and an outer diameter OD satisfies a relationship of SW/OD≤0.3.

According to the pneumatic tire, when the pneumatic tire mounted to the vehicle during travel of the vehicle rotates, the protrusion portions that rotate cause air around the protrusion portions to be turbulent and minimize air flow having low velocity. The air flow having low velocity is minimized, and a vortex generated from the tire housing on the rear side of the pneumatic tire in the advancement direction is subdivided. Then, the air pressure change becomes less significant along the side surface of the vehicle, and the air along the side surface of the vehicle is rectified. As a result, pass-by noise is reduced.

Additionally, according to the pneumatic tire of the present embodiment, by the ratio of the total width SW to the outer diameter OD satisfying the relationship SW/OD≤0.3, the total width is smaller and the outer diameter is greater than that of a typical pneumatic tire. Thus, rolling resistance and air resistance during travel can be reduced. While large diameter tires in particular tend to have increased air resistance caused by turbulent air flow not being generated due to a decrease in the relative speed between the side portion on the upper portion of the tire and the air, the pneumatic tire of the present embodiment includes the protrusion portion as well as satisfies the relationship of the ratio of the total width SW to the outer diameter OD. Thus, the air flow at the side portion on the upper portion of the tire can be made turbulent, allowing an effect of reducing the air resistance to be maintained.

Further, in the pneumatic tire according to an aspect of the present technology, the highest position of projection height of the intermediate portion is preferably in a range of 10% of the tire cross-sectional height from the tire maximum width position to the inner side and the outer side in the tire radial direction.

According to the pneumatic tire, the highest position of the projection height of the intermediate portion is disposed closer to the tire maximum width position. Accordingly, the function of minimizing the air flow having low velocity by causing the air around to be turbulent becomes significant. As a result, the effect of reducing pass-by noise can be obtained more significantly.

Additionally, in the pneumatic tire according to an aspect of the present technology, the intermediate portion of the protrusion portion preferably has a projection height ranging from 2 mm to 10 mm.

When the projection height of the intermediate portion is smaller than 2 mm, it is difficult to obtain the function of minimizing the air flow having low velocity. When the projection height of the intermediate portion is greater than 10 mm, the amount of air flow colliding with the protrusion portion is increased. As a result, air resistance is liable to increase. Thus, to obtain the effect of significantly reducing pass-by noise, the projection height of the intermediate portion preferably ranges from 2 mm to 10 mm.

Further, in the pneumatic tire according to an aspect of the present technology, a change in mass of the projection height of the protrusion portion in the tire circumferential direction per 1 degree in the tire circumferential direction preferably is 1 g/degree or less.

According to the pneumatic tire, by specifying the change in mass of the projection height of the protrusion portion in the tire circumferential direction, wind noise generated due to change in shape of the protrusion portion is capable of being suppressed. Accordingly, with the wind noise, the noise generated from the protrusion portion can be reduced.

Further, in the pneumatic tire according to an aspect of the present technology, a change in mass of the protrusion portion in the tire circumferential direction per 1 degree in the tire circumferential direction preferably is 0.1 g/degree or less.

According to the pneumatic tire, by specifying the change in mass of the protrusion portion in the tire circumferential direction, change in mass of the protrusion portion is capable of being suppressed. Accordingly, vibration generated along with the rotation of the pneumatic tire can be suppressed. With this vibration, the noise generated from the protrusion portion can be reduced.

Also, in the pneumatic tire according to an aspect of the present technology, an angle of the protrusion portion with respect to the tire radial direction with the end on the inner side in the tire radial direction as a reference point on the outer side in the tire radial direction preferably is from 15° to 85°.

According to the pneumatic tire, by specifying the angle of the protrusion portion, the air resistance caused by collision of the air against the protrusion portion can be reduced.

Further, in the pneumatic tire according an aspect of the present technology, a groove is preferably formed in a surface of the protrusion portion.

According to the pneumatic tire, by the groove being formed, the rigidity of the protrusion portion is decreased. As a result, a decrease in ride comfort due to the tire side portion being made a rigid structure by the protrusion portions can be suppressed. Additionally, by the groove being formed, the mass of the protrusion portion is decreased. As a result, a decrease in uniformity due to the protrusion portions increasing the mass of the tire side portion can be suppressed.

Further, in the pneumatic tire according an aspect of the present technology, a recessed portion is preferably formed on the surface of the protrusion portion.

According to the pneumatic tire, by the recessed portion being formed, the rigidity of the protrusion portion is decreased. As a result, a decrease in ride comfort due to the tire side portion being made a rigid structure by the protrusion portions can be suppressed. Additionally, by the recessed portion being formed, the mass of the protrusion portion is decreased. As a result, a decrease in uniformity due to the protrusion portions increasing the mass of the tire side portion can be suppressed.

Further, in the pneumatic tire according to an aspect of the present technology, the protrusion portions are preferably disposed at non-uniform intervals in the tire circumferential direction.

According to the pneumatic tire, by counteracting the periodicity of the protrusion portions in the tire circumferential direction related to the air flow along the tire side surface of the tire side portion, the difference in frequency causes the sound pressure generated by the protrusion portions to be dispersed and offset. As a result, noise (sound pressure level) generated in the pneumatic tire can be reduced.

Further, in the pneumatic tire according to an aspect of the present technology, the protrusion portions adjacent to each other in the tire circumferential direction preferably have inclination angles having different numerical symbols with respect to the tire circumferential direction.

According to the pneumatic tire, the inclination angles of the protrusion portions adjacent to each other in the tire circumferential direction have a reciprocal relationship. Thus, rotation directionality at the time of mounting to the vehicle is eliminated, and hence convenience can be improved.

Further, in the pneumatic tire according to an aspect of the present technology, a vehicle inner/outer side orientation is designated when the pneumatic tire is mounted on the vehicle, and the protrusion portions are preferably formed on at least the tire side portion corresponding to the vehicle outer side.

According to the pneumatic tire, the tire side portion on the vehicle outer side is exposed outward from the tire housing when the pneumatic tire is mounted on the vehicle. Thus, by the protrusion portions being provided on the tire side portion on the vehicle outer side, the air flow can be pushed in the vehicle outer side direction. This allows the effect of significantly subdividing the vortex generated from the tire housing on the rear side of the pneumatic tire in the advancement direction. Then, the air pressure change becomes less significant along the side surface of the vehicle, and the air along the side surface of the vehicle is rectified. This allows the effect of significantly reducing the pass-by noise to be obtained.

The pneumatic tire according to an embodiment of the present technology can reduce pass-by noise and air resistance.

BRIEF DESCRIPTION OF DRAWINGS

FIG. 3 is a table showing coefficients defined by aspect ratios.

FIG. 4 is a table showing specified rim widths that are closest values obtained from products of the coefficients defined as per the table of FIG. 3.

FIGS. 37A-37B include a table for showing results of performance tests of pneumatic tires according to Examples of the present technology.

FIGS. 38A-38B include a table for showing results of performance tests of pneumatic tires according to Examples of the present technology.

DETAILED DESCRIPTION

Embodiments of the present technology are described in detail below with reference to the drawings. However, the present technology is not limited by the embodiments. Further, constituents of the embodiments include elements that are essentially identical or that can be substituted or easily conceived by one skilled in the art. Furthermore, the modified examples described in the embodiments can be combined as desired within the scope apparent to one skilled in the art.

Figure 1:
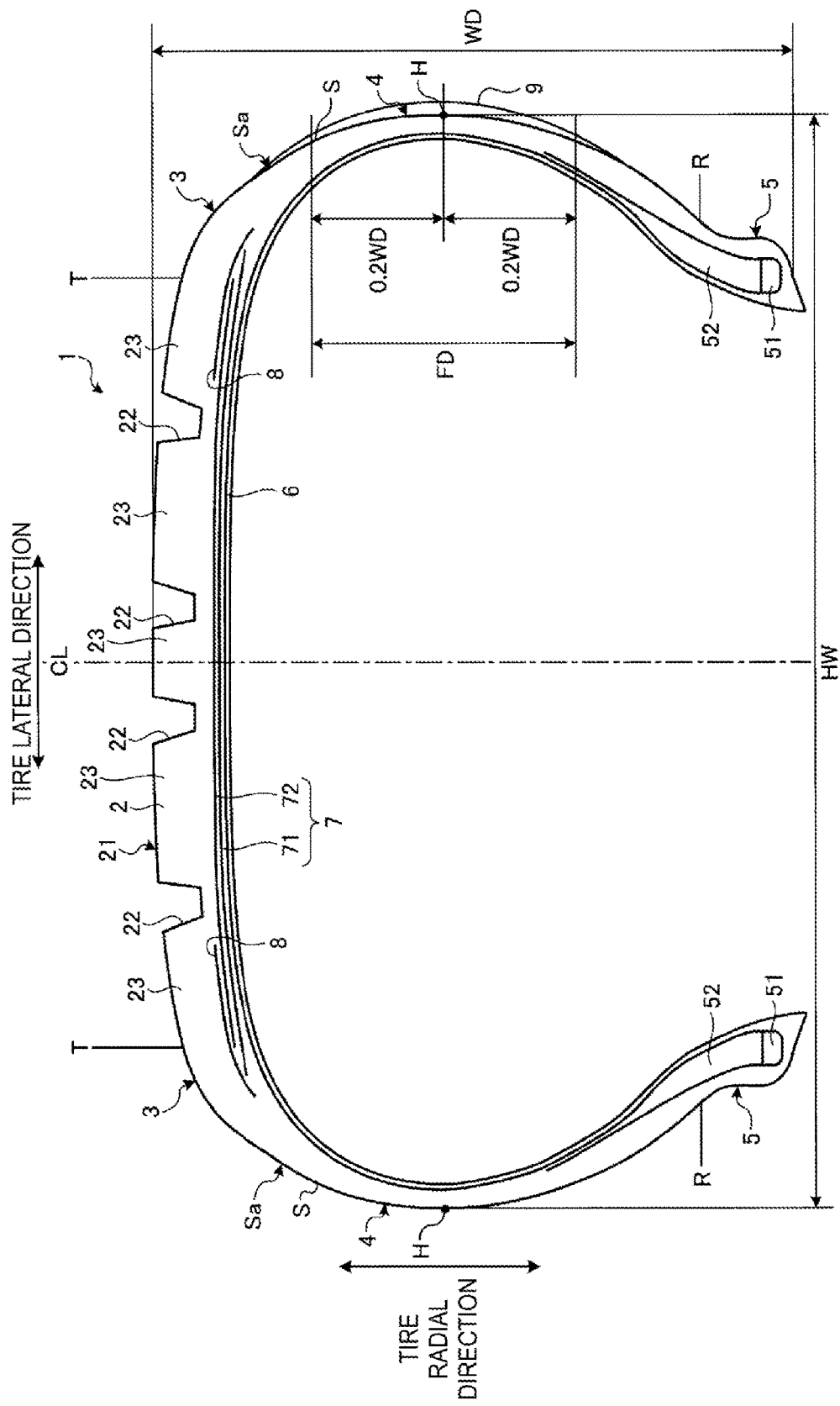
FIG. 1 is a meridian cross-sectional view of a pneumatic tire according to an embodiment of the present technology.
Figure 2:
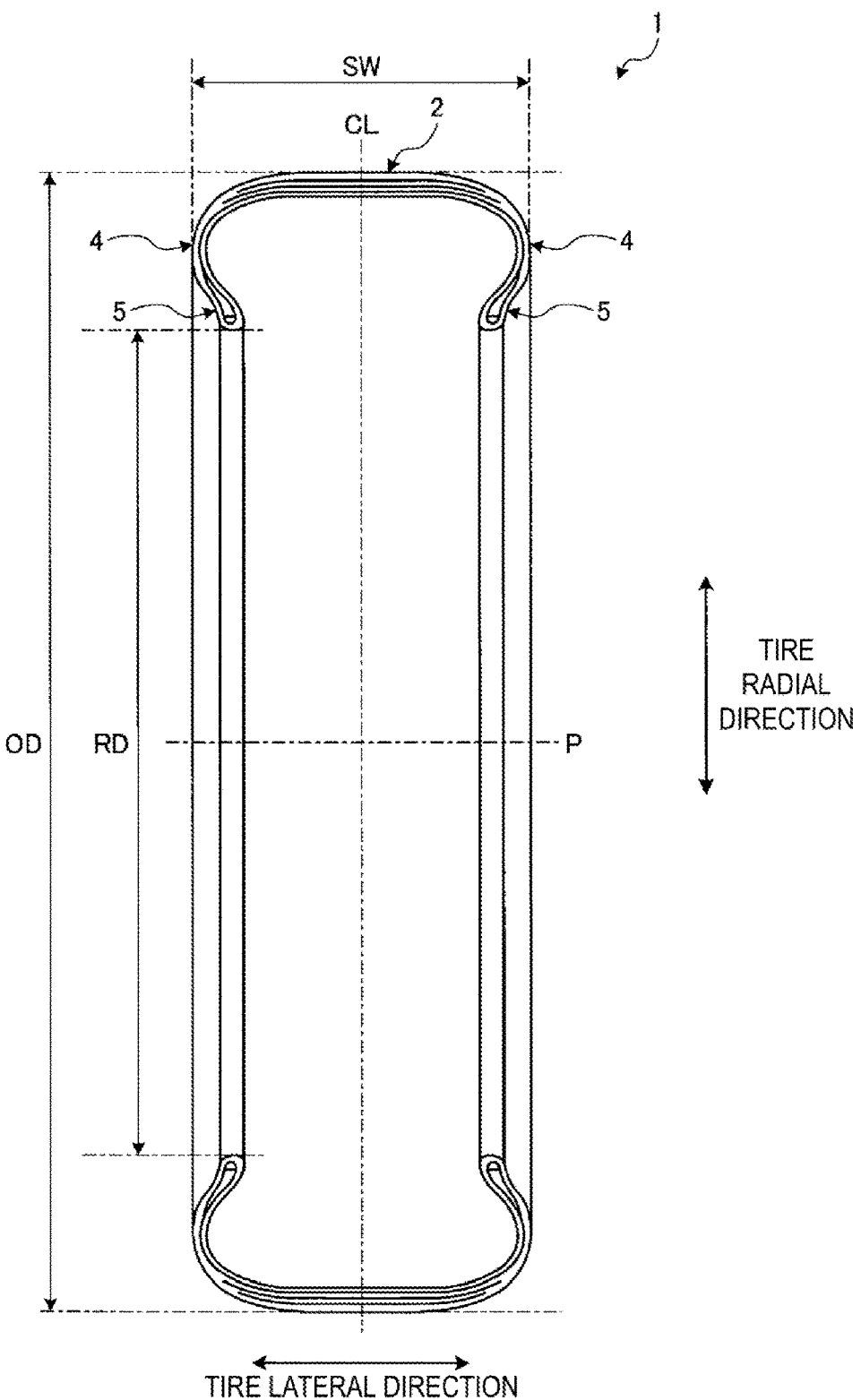
FIG. 2 is a meridian cross-sectional view of an entire pneumatic tire according to an embodiment of the present technology.

FIG. 1 is a meridian cross-sectional view of a pneumatic tire according to the present embodiment. FIG. 2 is a meridian cross-sectional view of the entire pneumatic tire according to an embodiment of the present technology.

In the following description, "tire radial direction" refers to the direction orthogonal to the rotation axis P (see FIG. 5) of a pneumatic tire 1. "Inward in the tire radial direction" refers to the direction toward the rotation axis P in the tire radial direction. "Outward in the tire radial direction" refers to the direction away from the rotation axis P in the tire radial direction. "Tire circumferential direction" refers to the circumferential direction with the rotation axis P as the center axis. Additionally, "tire lateral direction" refers to the direction parallel with the rotation axis P. "Inward in the tire lateral direction" refers to the direction toward a tire equatorial plane (tire equator line) CL in the tire lateral direction. "Outward in the tire lateral direction" refers to the direction away from the tire equatorial plane CL in the tire lateral direction. "Tire equatorial plane CL" refers to a plane that is orthogonal to the rotation axis P of the pneumatic tire 1 and that passes through a center of a tire width of the pneumatic tire 1. "Tire width" is the width in the tire lateral direction between portions located outward in the tire lateral direction, or in other words, the distance between the portions that are the most distant from the tire equatorial plane CL in the tire lateral direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 includes a tread portion 2, shoulder portions 3 on opposite sides of the tread portion 2, and sidewall portions 4 and bead portions 5 continuing on from the shoulder portions 3 in that order. Additionally, the pneumatic tire 1 includes a carcass layer 6, a belt layer 7, and a belt reinforcing layer 8.

The tread portion 2 is made of a rubber material (tread rubber) and is exposed on the outermost side of the pneumatic tire 1 in the tire radial direction, with the surface thereof constituting the profile of the pneumatic tire 1. A tread surface 21 is formed on the outer circumferential surface of the tread portion 2, in other words, on the road contact surface that comes into contact with the road surface when running. The tread surface 21 is provided with a plurality (four in the present embodiment) of main grooves 22 that are straight main grooves extending in the tire circumferential direction parallel with the tire equator line CL. Moreover, a plurality of rib-like land portions 23 extending in the tire circumferential direction and parallel with the tire equator line CL are formed in the tread surface 21 by the plurality of main grooves 22. Additionally, while not illustrated in the drawings, lug grooves that meet with the main grooves 22 in each of the land portions 23 are provided in the tread surface 21. The land portions 23 are divided into a plurality of segments in the tire circumferential direction by the lug grooves. Additionally, lug grooves are formed in the outermost side of the tread portion 2 in the tire lateral direction so as to open outward in the tire lateral direction of the tread portion 2. Note that the lug grooves may have a form that communicates with the main grooves 22 or may have a form that does not communicate with the main grooves 22.

The shoulder portions 3 are portions of the tread portion 2 located outward in the tire lateral direction on both sides. Additionally, the sidewall portions 4 are exposed on the outermost sides of the pneumatic tire 1 in the tire lateral direction. The bead portions 5 each include a bead core 51 and a bead filler 52. The bead core 51 is formed by winding a bead wire, which is a steel wire, into an annular shape. The bead filler 52 is a rubber material that is disposed in the space formed by an end of the carcass layer 6 in the tire lateral direction being folded back at the position of the bead core 51.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction. The carcass cords are made of organic fibers (polyester, rayon, nylon, or the like). The carcass layer 6 is provided with at least one layer.

The belt layer 7 has a multilayer structure in which at least two belts 71, 72 are layered. In the tread portion 2, the belt layer 7 is disposed outward of the carcass layer 6 in the tire radial direction, i.e. on the outer circumference thereof, and covers the carcass layer 6 in the tire circumferential direction. The belts 71, 72 are made of coating rubber-covered cords (not illustrated) disposed side by side at a predetermined angle with respect to the tire circumferential direction (for example, from 20° to 30°). The cords are made of steel or organic fibers (polyester, rayon, nylon, or the like). Moreover, the belts 71, 72 overlap with each other and are disposed so that the direction of the cords of the respective belts intersect each other.

The belt reinforcing layer 8 is disposed outward of the belt layer 7 in the tire radial direction, i.e. on the outer circumference thereof, and covers the belt layer 7 in the tire circumferential direction. The belt reinforcing layer 8 is made of coating rubber-covered cords (not illustrated) disposed side by side in the tire lateral direction substantially parallel (±5°) to the tire circumferential direction. The cords are made of steel or organic fibers (polyester, rayon, nylon, or the like). The belt reinforcing layer 8 illustrated in FIG. 1 is disposed so as to cover end portions of the belt layer 7 in the tire lateral direction. The configuration of the belt reinforcing layer 8 is not limited to that described above. Although not illustrated in the drawings, a configuration may be used in which the belt reinforcing layer 8 is disposed so as to cover the entire belt layer 7. Alternatively, for example, a configuration with two reinforcing layers may be used, in which the inner reinforcing layer in the tire radial direction is formed larger than the belt layer 7 in the tire lateral direction so as to cover the entire belt layer 7, and the outer reinforcing layer in the tire radial direction is disposed so as to only cover the end portions of the belt layer 7 in the tire lateral direction. In another example, a configuration with two reinforcing layers may be used, in which both of the reinforcing layers are disposed so as to only cover the end portions of the belt layer 7 in the tire lateral direction. In other words, the belt reinforcing layer 8 overlaps with at least the end portions of the belt layer 7 in the tire lateral direction. Additionally, the belt reinforcing layer 8 is constituted of a band-like strip material (having, for example, a width of 10 mm) wound in the tire circumferential direction.

Figure 5:
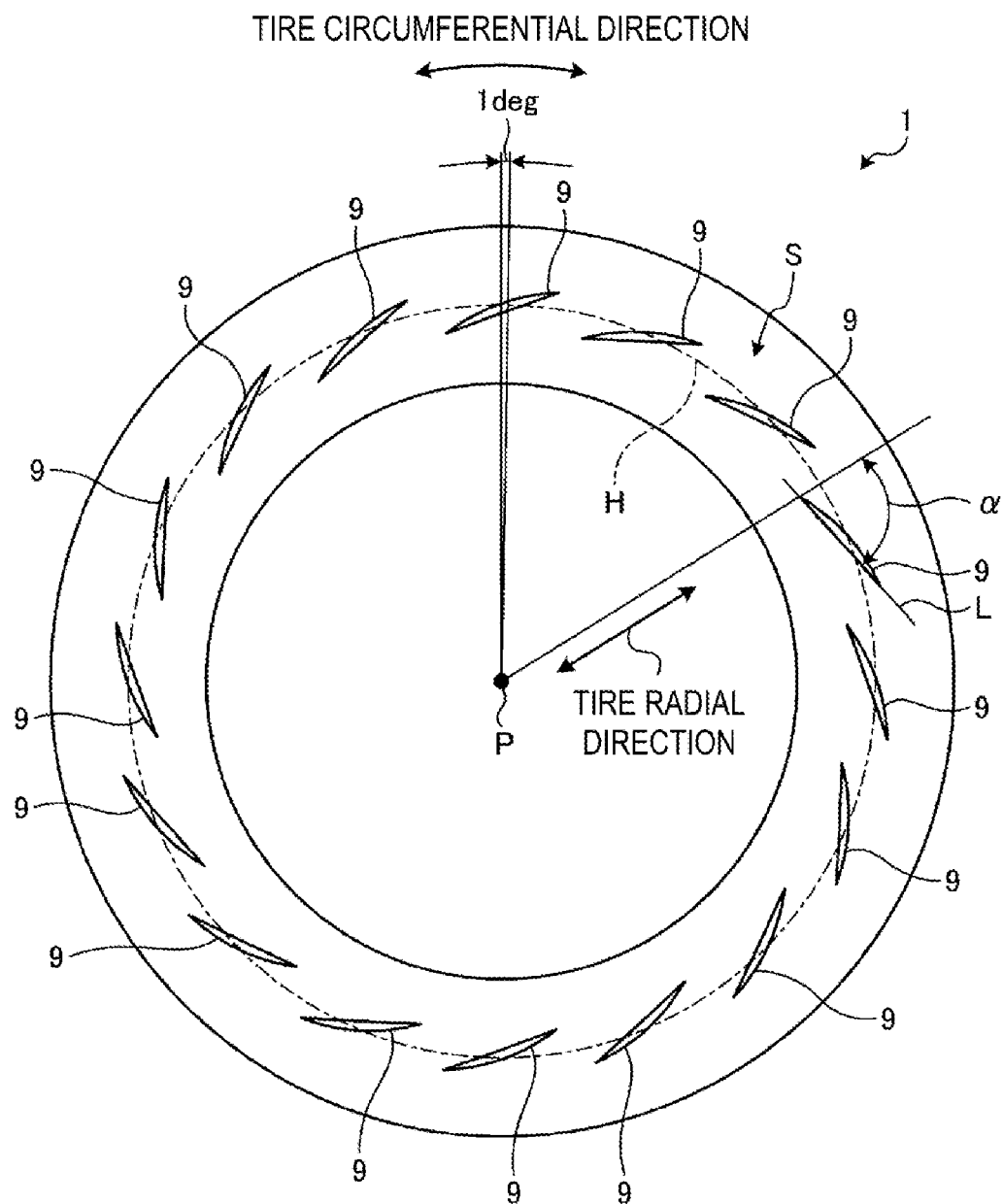
FIG. 5 is a side view of a pneumatic tire according to an embodiment of the present technology.
Figure 6:
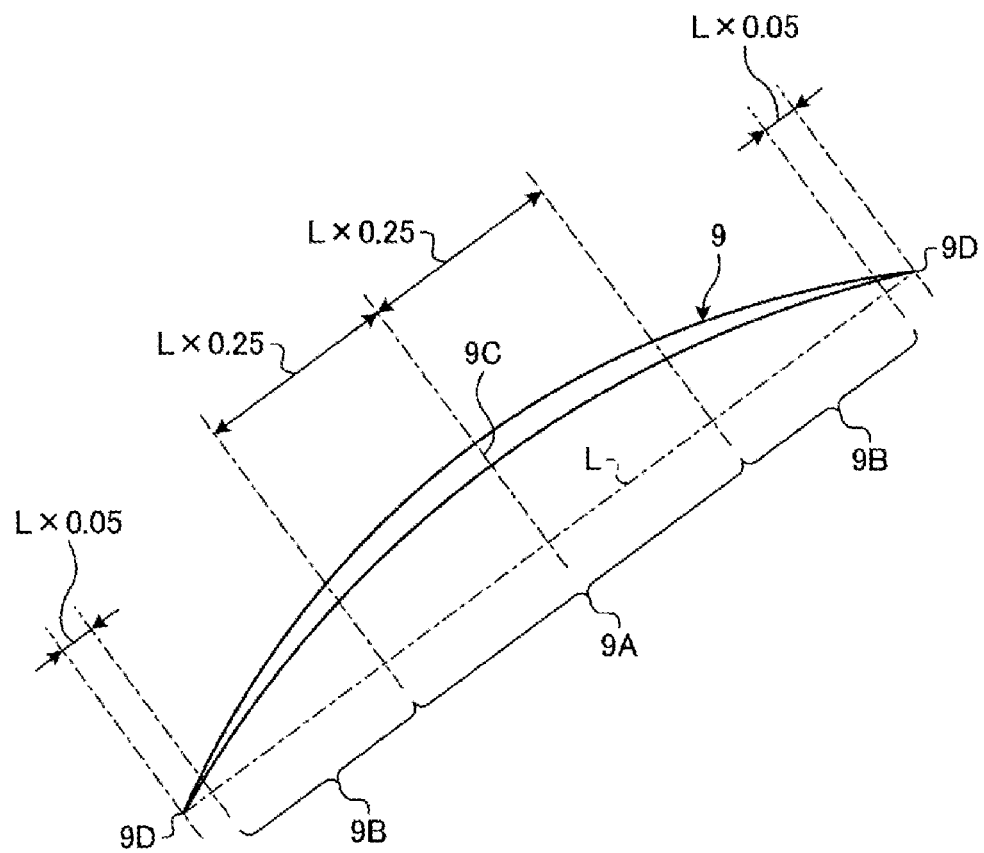
FIG. 6 is an enlarged view of a protrusion portion as viewed from a side of a pneumatic tire.
Figure 7:
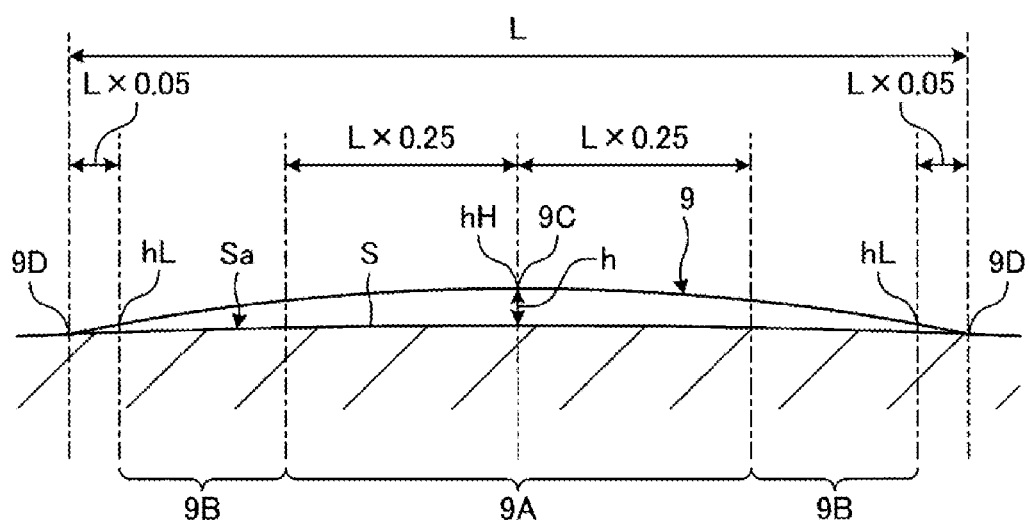
FIG. 7 is a side view of a protrusion portion.
Figure 26:
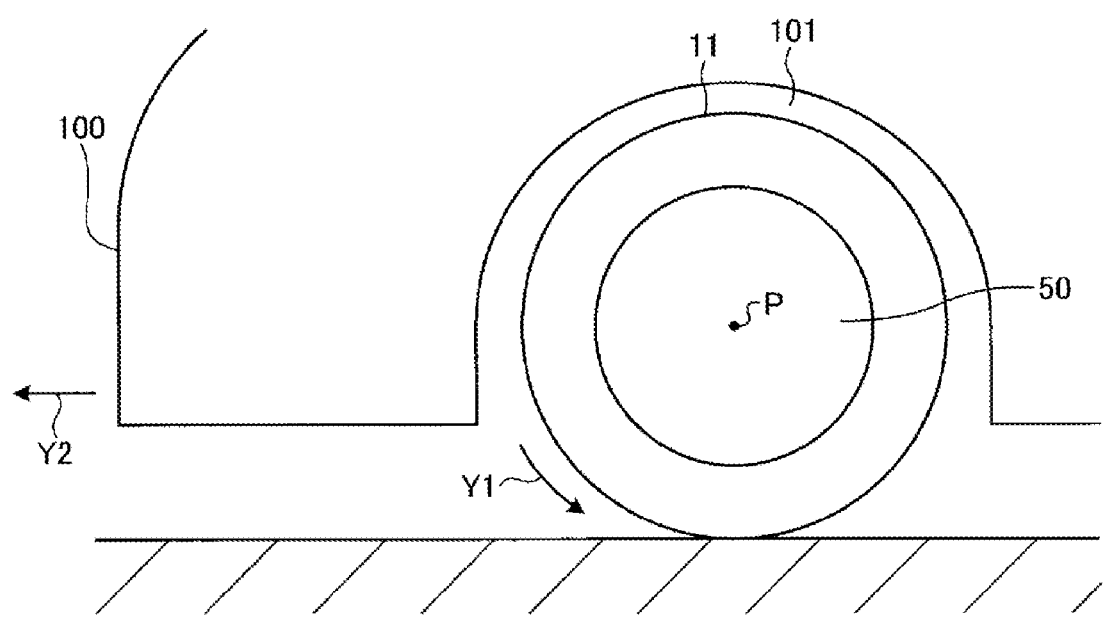
FIG. 26 is an explanatory diagram of a function of a conventional pneumatic tire.
Figure 27:
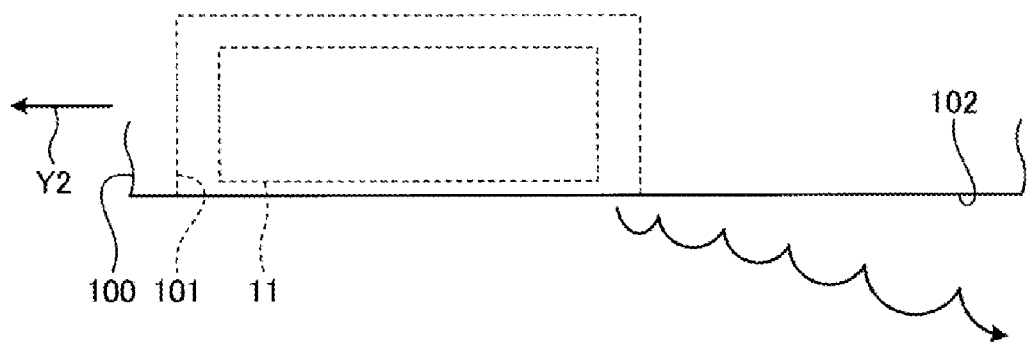
FIG. 27 is an explanatory diagram of a function of a conventional pneumatic tire
Figure 28:
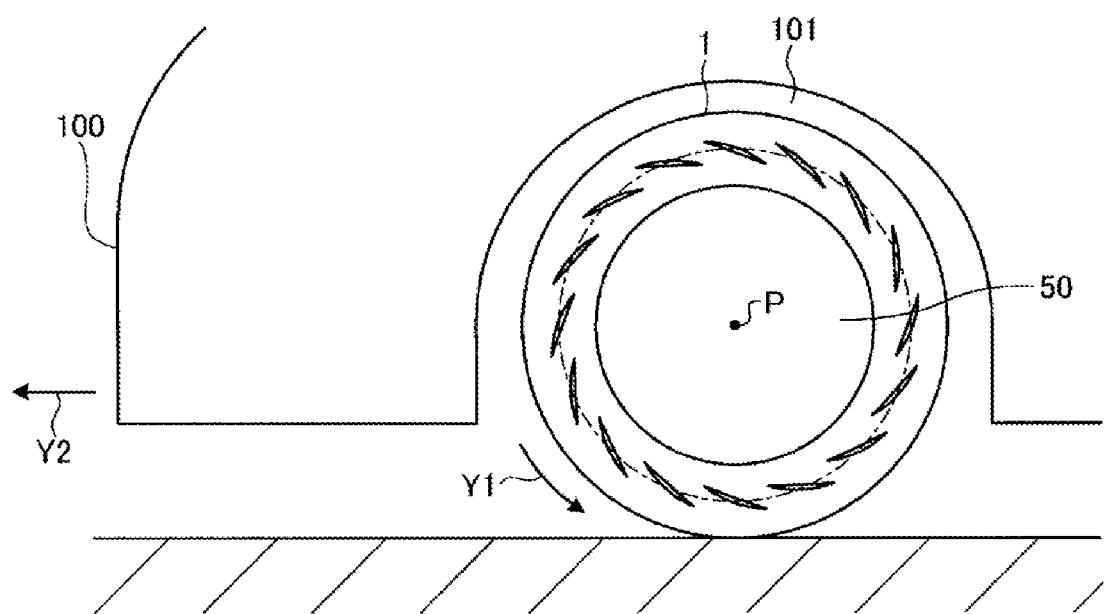
FIG. 28 is an explanatory diagram of a function of a pneumatic tire according to an embodiment of the present technology.
Figure 29:
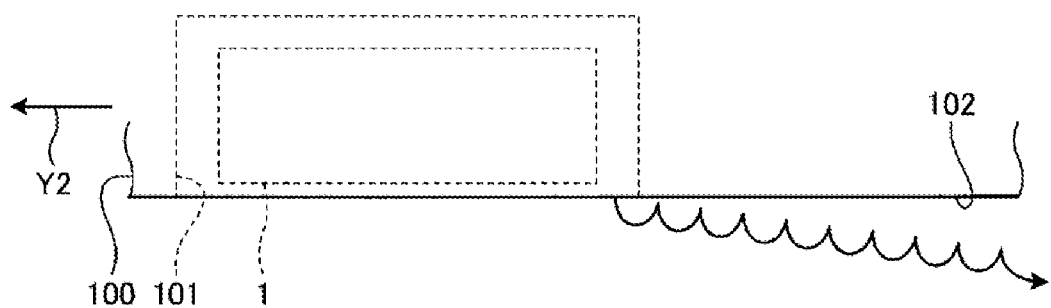
FIG. 29 is an explanatory diagram of a function of a pneumatic tire according to an embodiment of the present technology.
Figure 30:
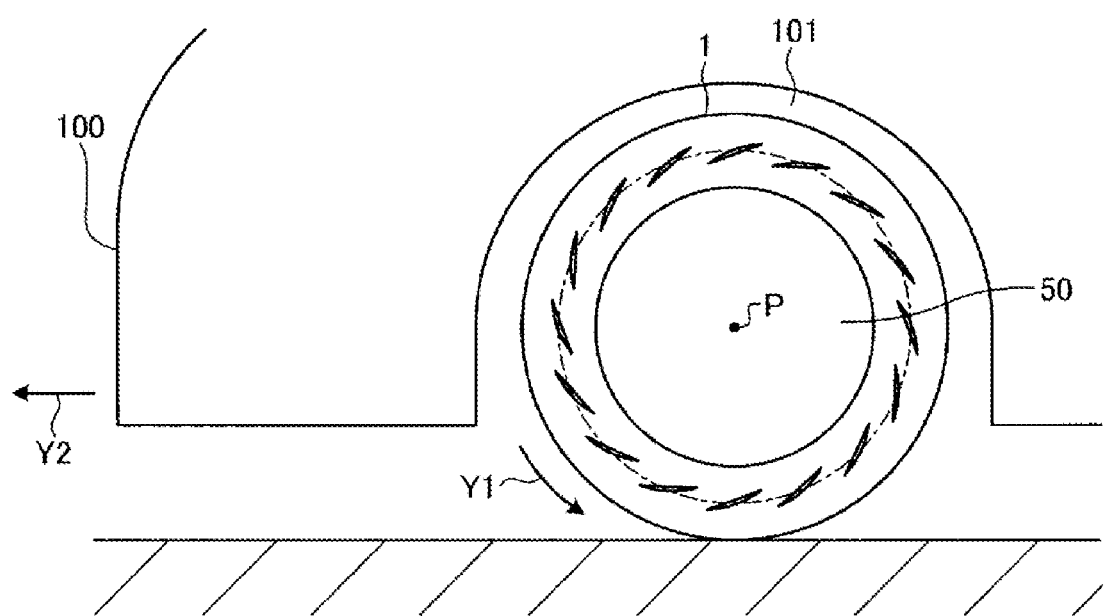
FIG. 30 is an explanatory diagram of a function of a pneumatic tire according to an embodiment of the present technology.
Figure 31:
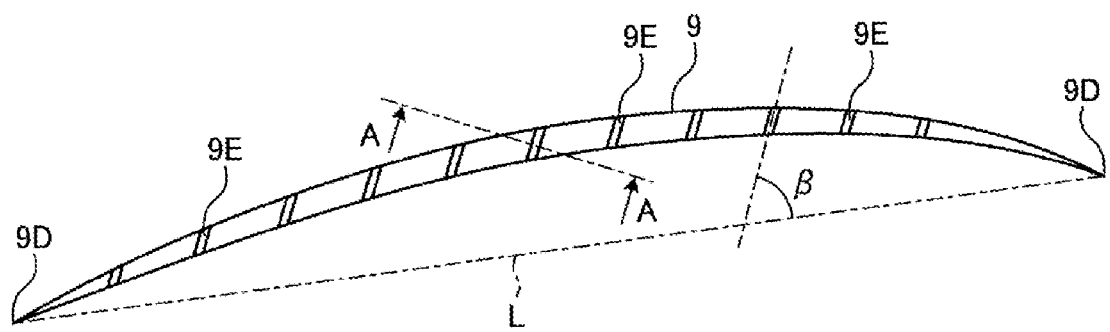
FIG. 31 is an enlarged view of a protrusion portion in which grooves are formed as viewed from a side of a pneumatic tire.
Figure 32:
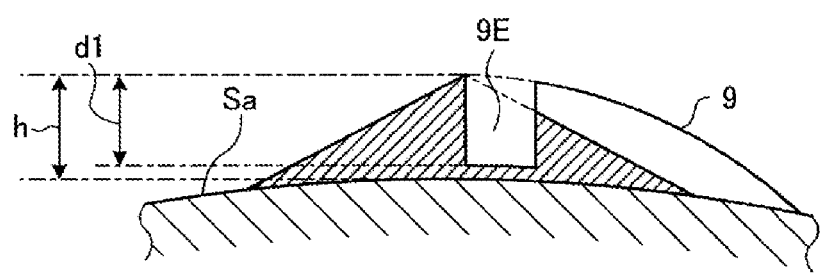
FIG. 32 is a cross-sectional view taken along line A-A of FIG. 31.
Figure 33:
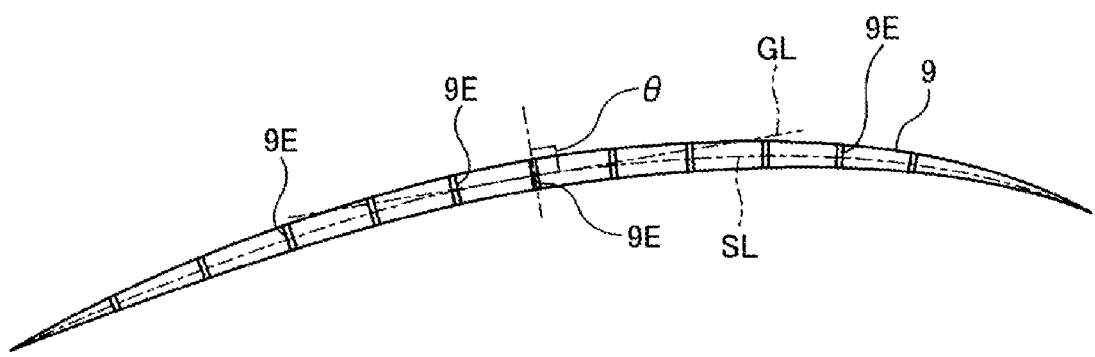
FIG. 33 is an enlarged view of another example of a protrusion portion in which grooves are formed as viewed from a side of a pneumatic tire.
Figure 34:
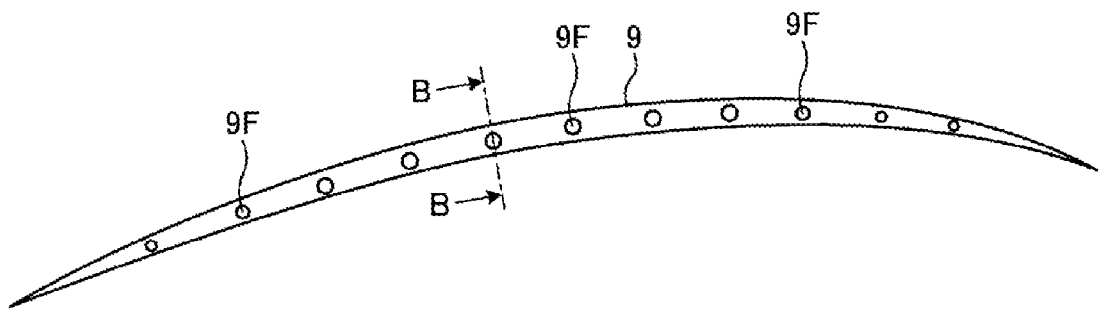
FIG. 34 is an enlarged view of a protrusion portion in which recessed portions are formed as viewed from a side of a pneumatic tire.
Figure 35:
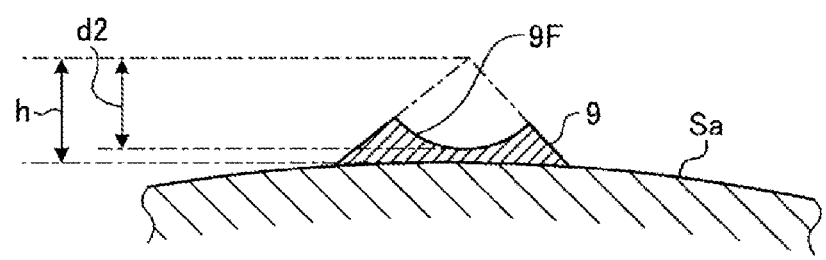
FIG. 35 is a cross-sectional view taken along line B-B of FIG. 34.
Figure 36:
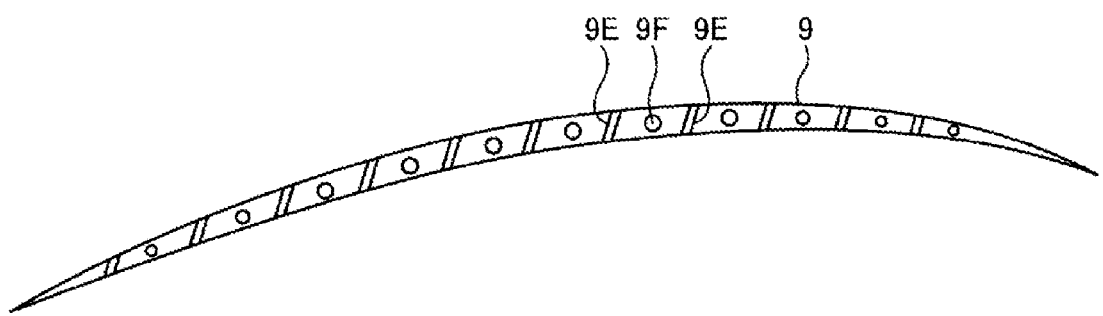
FIG. 36 is an enlarged view of a protrusion portion in which grooves and recessed portions are formed as viewed from a side of a pneumatic tire.

FIG. 3 is a table showing coefficients defined by aspect ratios. FIG. 4 is a table showing specified rim widths that are closest values obtained from products of the coefficients defined as per the table of FIG. 3. FIG. 5 is a side view of a pneumatic tire according to an embodiment of the present technology. FIG. 6 is an enlarged view of a protrusion portion as viewed from a side of the pneumatic tire. FIG. 7 is a side view of the protrusion portion. FIGS. 8 to 13 are side views of other examples of a pneumatic tire according to the present embodiment. FIGS. 14 to 25 are a cross-sectional views in the lateral direction of a protrusion portion. FIGS. 26 and 27 are explanatory diagrams of a function of a conventional pneumatic tire. FIGS. 28 to 30 are explanatory diagrams of a function of a pneumatic tire according to an embodiment of the present technology. FIG. 31 is an enlarged view of a protrusion portion in which grooves are formed as viewed from the side of a pneumatic tire. FIG. 32 is a cross-sectional view taken along line A-A of FIG. 31. FIG. 33 is an enlarged view of another example of a protrusion portion in which grooves are formed as viewed from the side of a pneumatic tire. FIG. 34 is an enlarged view of a protrusion portion in which recessed portions are formed as viewed from the side of a pneumatic tire. FIG. 35 is a cross-sectional view taken along line B-B of FIG. 34. FIG. 36 is an enlarged view of a protrusion portion in which grooves and recessed portions are formed as viewed from the side of a pneumatic tire.

Herein, a total width SW is the interval between the sidewall portions 4 including any designs (patterns or alphanumerics on the tire side surface) on the sidewall portions 4 when the pneumatic tire 1 is mounted on a regular rim, inflated to a regular internal pressure (for example, 230 kPa), and in an unloaded state. An outer diameter OD is the outer diameter of the tire under the same conditions, and an inner diameter RD is the inner diameter of the tire under the same conditions. Note that the internal pressure of 230 kPa described above is selected for the purpose of specifying the dimensions of the pneumatic tire such as the total width SW. All the parameters of the tire dimensions stated in this specification are specified under an internal pressure of 230 kPa and in the unloaded state. However, it should be understood that inflating to an internal pressure of 230 kPa is not necessary for the application of the present technology, and the pneumatic tire 1 according to the present technology inflated to an internal pressure in the range typically used exhibits the effects of the present technology.

Additionally, as illustrated in FIG. 1, "tire side portion S" refers to the surface that uniformly continues from a ground contact edge T of the tread portion 2 outward in the tire lateral direction, or, in other words, a range from a rim check line R outward in the tire radial direction. Additionally, "ground contact edge T" refers to both outermost edges in the tire lateral direction of a region in which the tread surface 21 of the tread portion 2 of the pneumatic tire 1 contacts the road surface, with the pneumatic tire 1 being mounted on a regular rim, inflated to the regular internal pressure, and loaded with 70% of the regular load. The ground contact edge T is continuous in the tire circumferential direction. Moreover, "rim check line R" refers to a line used to confirm whether the tire has been mounted on the rim correctly and, typically, is an annular convex line closer to the outer side in the tire radial direction than a rim flange and continues in the tire circumferential direction along a portion approximate to the rim flange on a front side surface of the bead portions 5.

As illustrated in FIG. 1, "tire maximum width position H" refers to the ends of a tire cross-sectional width HW where the width in the tire lateral direction is the greatest. "Tire cross-sectional width HW" is the maximum total tire width SW in the tire lateral direction, excluding any patterns and alphanumerics on a tire side surface, when the pneumatic tire 1 is mounted on a regular rim, inflated to the regular internal pressure, and in an unloaded state. In tires provided with a rim protection bar (provided in the tire circumferential direction and projecting outward in the tire lateral direction) that protects the rim, the rim protection bar is the outermost portion in the tire lateral direction, but the tire cross-sectional width HW as defined in the present embodiment excludes the rim protection bar.

Note that the "regular rim" refers to a "standard rim" defined by JATMA (Japan Automobile Tyre Manufacturers Association, Inc.), a "Design Rim" defined by TRA (The Tire and Rim Association, Inc.), or a "Measuring Rim" defined by ETRTO (European Tyre and Rim Technical Organisation). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

In the pneumatic tire 1 of the present embodiment, as illustrated in FIG. 2, the ratio of the total width SW to the outer diameter OD satisfies the relationship SW/OD≤0.3. In the pneumatic tire 1 of the present embodiment, the ratio of the inner diameter RD to the outer diameter OD satisfies the relationship RD/OD≥0.7.

The rim used in the present embodiment has a rim diameter compatible with the inner diameter of the pneumatic tire 1, and has a nominal rim width corresponding to the specified rim width Rm (mm) shown in FIG. 4 that is the closest value (Rm=K1×Sn) obtained from the product of the nominal tire section width Sn and the coefficient K1 determined according to the aspect ratio, described in the correspondence table of FIG. 3, of the tire mounted on the rim, in accordance with ISO (International Organization for Standardization) 4000-1:2001.

In the pneumatic tire 1 of the present embodiment, as illustrated in FIGS. 5 to 7, a protrusion portion 9 is provided on at least one tire side portion S projecting outward beyond a tire side surface Sa that corresponds to the profile of the surface of the tire side portion S. The protrusion portion 9 is formed from a rubber material (the same rubber material that constitutes the tire side portion S or a different rubber material) as a ridge that extends along the tire side surface Sa of the tire side portion S in a direction that intersects the tire circumferential direction and the tire radial direction. The extension direction refers to a straight line L connecting ends 9D as illustrated in FIG. 6. Note that in the present embodiment, the protrusion portion 9 illustrated in the drawings curves in a C-shape when viewed from the side of the pneumatic tire 1. The protrusion portion 9 is not limited to being curved and may be linear when viewed from the side of the pneumatic tire 1, may be formed in a V-shape, may be formed in an S-shape, may have a meandering configuration, or may have a zigzag shape. Further, in any configuration, the extension direction refers to the straight line connecting the ends.

As illustrated in FIGS. 6 and 7, the protrusion portion 9 includes an intermediate portion 9A in the extension direction, and end portions 9B provided continuing from the intermediate portion 9A on either side in the extension direction. The intermediate portion 9A is the portion in the range of 25% of the length L of the protrusion portion 9 in the extension direction from a center 9C on either side in the extension direction. The end portions 9B are portions that extend from the intermediate portion 9A on both sides in the extension direction excluding 5% of the length L of the protrusion portion 9 in the extension direction from ends 9D in the extension direction. The length L of the protrusion portion 9 in the extension direction is the shortest distance between the ends 9D of the protrusion portion 9.

The intermediate portion 9A also includes a highest position hH where the projection height h from the tire side surface Sa is the greatest. The end portion 9B also includes a lowest position hL where a projection height h from the tire side surface Sa is the lowest. In FIG. 7, the projection height h of the protrusion portion 9 in the extension direction gradually increases from one end 9D toward the center 9C and gradually decreases from the center 9C toward the other end 9D. In such a configuration, the highest position hH of the projection height h corresponds with the center 9C, and the lowest position hL corresponds with the ends of the end portions 9B, i.e. the positions 5% of the length L from the ends 9D. Note that in FIG. 7, the projection height h of the protrusion portion 9 in the extension direction is illustrated changing in an arcuate manner. However, no such limitation is intended and it may change in a linear manner. Additionally, the highest position hH may include the entire intermediate portion 9A, and in such a configuration, the end portions 9B may have a projection height h that gradually decreases from the intermediate portion 9A.

Further, as illustrated in FIGS. 1 to 7, the protrusion portion 9 is disposed in a range of the tire side portion S so that the highest position hH of the projection height h of the intermediate portion 9A is within a range FD that is 20% of a tire cross-sectional height WD from the tire maximum width position H to the inner side and the outer side in the tire radial direction (=0.2WD×2). That is, the protrusion portion 9 is disposed so that the highest position hH of the projection height h of the intermediate portion 9A is within the above-mentioned range FD and the end portions 9B are outside of the above-mentioned range FD. The plurality of protrusion portions 9 are disposed in the tire circumferential direction. Note that, the tire cross-sectional height WD is one-half of a difference between an outer diameter and a rim diameter under a state in which the pneumatic tire 1 is mounted on a regular rim, inflated to a regular internal pressure, and in an unloaded state.

Figure 8:
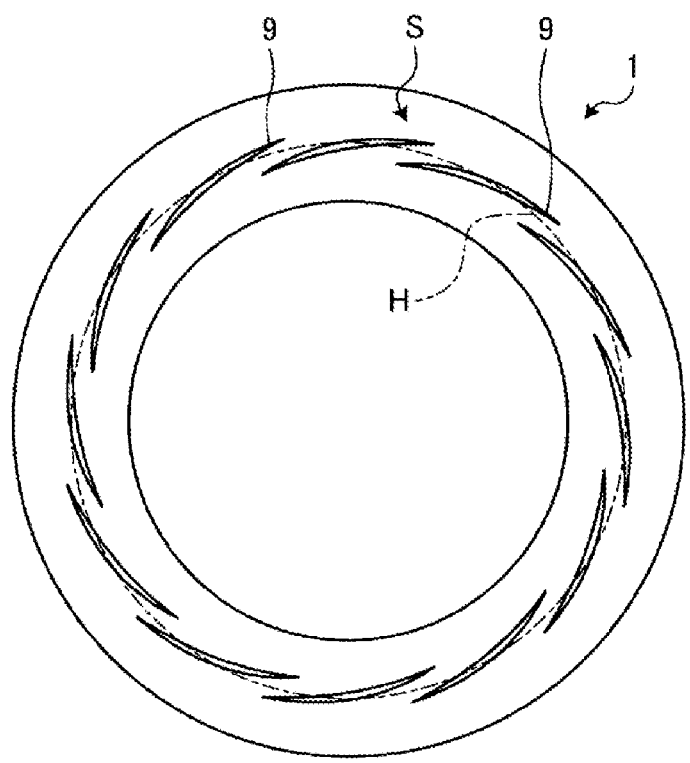
FIG. 8 is a side view of another example of a pneumatic tire according to an embodiment of the present technology.
Figure 9:
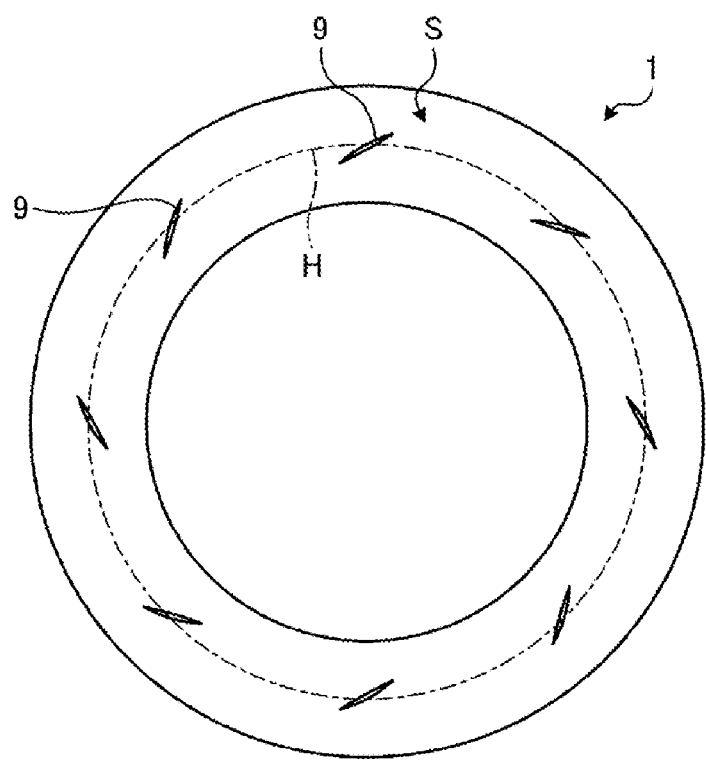
FIG. 9 is a side view of another example of a pneumatic tire according to an embodiment of the present technology.

As for disposition of the protrusion portions 9, as illustrated in FIGS. 5 and 9, the protrusion portions 9 may be provided at intervals in the tire circumferential direction. As illustrated in FIG. 8, the protrusion portions 9 adjacent to each other in the tire circumferential direction may be provided so as to partially overlap with each other. In the case where the protrusion portions 9 are provided so as to partially overlap with each other in the tire radial direction, the overlapping portion refers to a portion excluding the intermediate portion 9A but including ends of the end portions 9B (range of 5% of the length L from the ends 9D). Further, as for disposition of the protrusion portions 9, as illustrated in FIGS. 10 to 13, the protrusion portions 9 adjacent to each other in the tire circumferential direction may have extension directions differently inclined with respect to the tire circumferential direction and the tire radial direction. In such case where the protrusion portions 9 adjacent to each other in the tire circumferential direction have the extension directions differently inclined with respect to the tire circumferential direction and the tire radial direction, the protrusion portions 9 adjacent to each other in the tire circumferential direction are provided at intervals in the circumferential direction without partially overlapping with each other in the tire radial direction.

Figure 14:
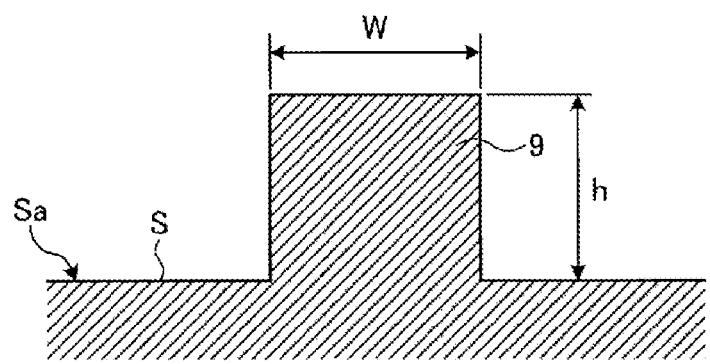
FIG. 14 is a cross-sectional view in a lateral direction of a protrusion portion.

The cross-sectional shape in the lateral direction orthogonal to the extension direction of the protrusion portions 9 has a quadrangular cross-sectional shape in the lateral direction, as illustrated by the protrusion portion 9 in FIG. 14. The protrusion portion 9 illustrated in FIG. 15 has a triangular cross-sectional shape in the lateral direction. The protrusion portion 9 illustrated in FIG. 16 has a trapezoidal cross-sectional shape in the lateral direction.

Also, the cross-sectional shape in the lateral direction of the protrusion portions 9 may have an external form based on curved lines. The protrusion portion 9 illustrated in FIG. 17 has a semi-circular cross-sectional shape in the lateral direction. In addition, while not illustrated in the drawings, the cross-sectional shape in the lateral direction of the protrusion portion 9 may also have a semi-oval shape, a semi-elliptical shape, or any other arcuate shape.

Figure 18:
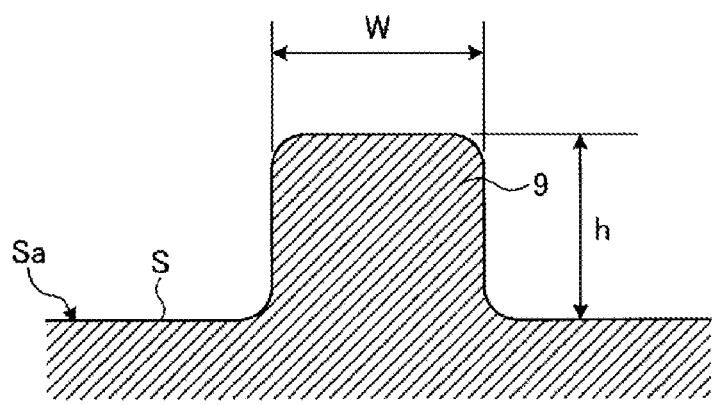
FIG. 18 is a cross-sectional view in a lateral direction of a protrusion portion.
Figure 19:
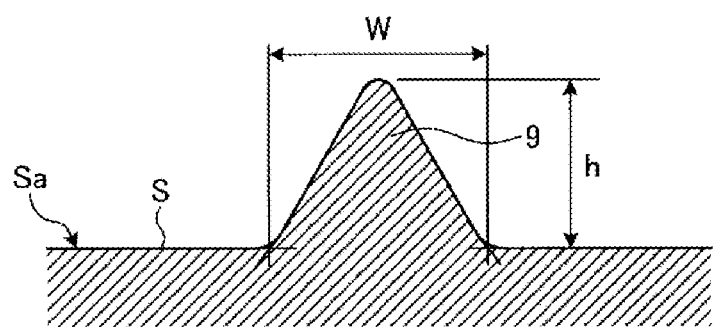
FIG. 19 is a cross-sectional view in a lateral direction of a protrusion portion.
Figure 20:
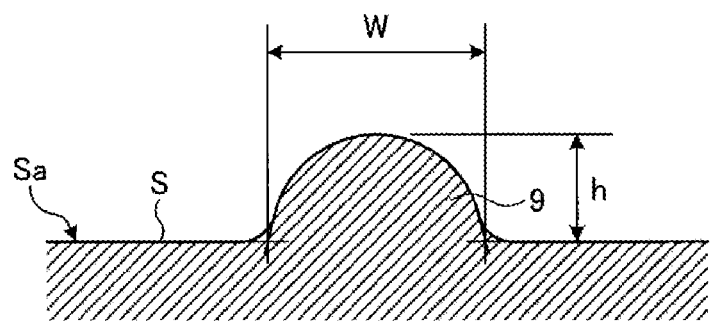
FIG. 20 is a cross-sectional view in a lateral direction of a protrusion portion.
Figure 21:
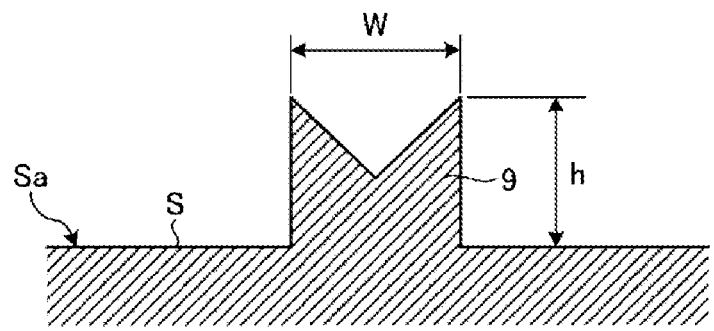
FIG. 21 is a cross-sectional view in a lateral direction of a protrusion portion.
Figure 22:
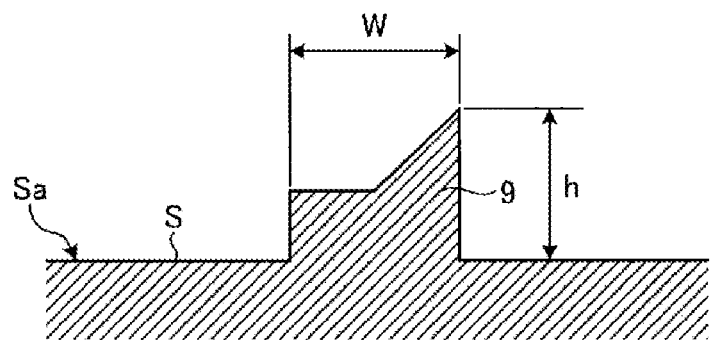
FIG. 22 is a cross-sectional view in a lateral direction of a protrusion portion.
Figure 23:
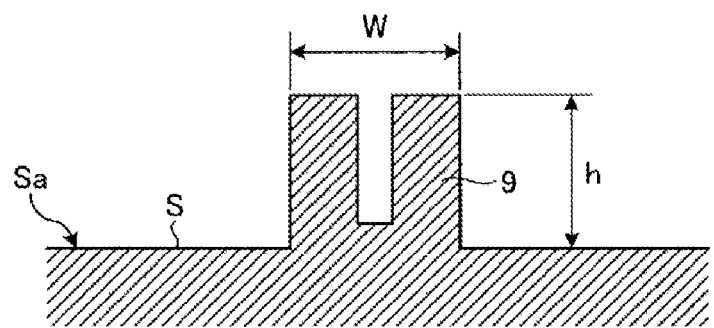
FIG. 23 is a cross-sectional view in a lateral direction of a protrusion portion.
Figure 24:
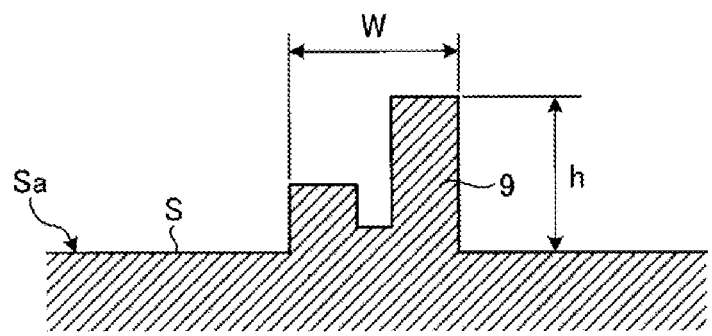
FIG. 24 is a cross-sectional view in a lateral direction of a protrusion portion.
Figure 25:
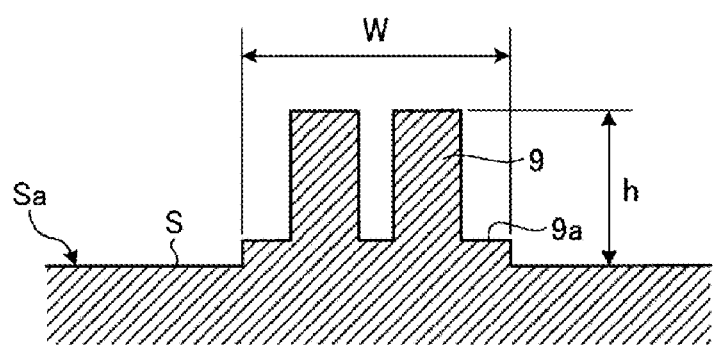
FIG. 25 is a cross-sectional view in a lateral direction of a protrusion portion.

Also, the cross-sectional shape in the lateral direction of the protrusion portion 9 may have an external form that is a combination of straight lines and curves. The protrusion portion 9 illustrated in FIG. 18 has a cross-sectional shape in the lateral direction that is a quadrangular shape with curved corners. The protrusion portion 9 illustrated in FIG. 19 has a cross-sectional shape in the lateral direction that is a triangular shape with curved corners. Also, as illustrated in FIGS. 18 to 20, the cross-sectional shape in the lateral direction of the protrusion portions 9 may have a shape in which the base portion that projects from the tire side portion S is curved.

Also, the cross-sectional shape in the lateral direction of the protrusion portion 9 may be a combination of shapes. The protrusion portion 9 illustrated in FIG. 21 includes a quadrangular top portion shaped into a zigzag shape by a plurality of triangular shapes (two in FIG. 21). The protrusion portion 9 illustrated in FIG. 22 includes a quadrangular top portion shaped with a point by one triangular shape. The protrusion portion 9 illustrated in FIG. 23 includes a quadrangular top portion shaped into a quadrangular recess. The protrusion portion 9 illustrated in FIG. 24 includes a quadrangular top portion shaped into a quadrangular recess with the projection height on either side of the recess differing. The protrusion portion 9 illustrated in FIG. 25 includes a quadrangular platform portion 9a formed projecting from the tire side portion S. A plurality of quadrangular shapes (two in FIG. 25) are formed on the platform portion 9a in a projecting manner. In addition, while not illustrated in the drawings, the cross-sectional shape in the lateral direction of the protrusion portion 9 may include a quadrangular top portion with a wave-like shape, or have another shape.

Additionally, in the present embodiment, the cross-sectional area of the cross-sectional shape in the lateral direction of the protrusion portion 9 such as that described above is greatest at the highest position hH of the projection height h of the intermediate portion 9A, and the cross-sectional area is small at the lowest positions hL of the projection height h of the end portions 9B. A width W in the lateral direction may follow the change in the projection height h and be greatest at the highest position hH and smallest at the lowest position hL, or may not change in this manner.

The function of the pneumatic tire 1 is described. First, as illustrated in FIG. 26, a conventional pneumatic tire 11 without the protrusion portions 9 is mounted on a rim 50 to be mounted to a vehicle 100. In this manner, the conventional pneumatic tire 11 is disposed in a tire housing 101 of the vehicle 100. In this state, when the pneumatic tire 11 rotates in a rotation direction Y1, the vehicle 100 travels in a direction Y2. When the vehicle 100 travels, the air flow around the pneumatic tire 11 has low velocity. Then, as illustrated in FIG. 27, due to the air flow having low velocity, a large vortex is generated from the tire housing 101 on the rear side of the pneumatic tire 11 in the advancement direction. With the vortex, the air pressure fluctuation becomes significant along the side surface 102 of the vehicle 100, and large air turbulence is caused along the side surface 102 of the vehicle 100. As a result, the vehicle external noise, that is, pass-by noise, becomes excessively large.

As a countermeasure to such phenomenon, as illustrated in FIG. 28, the pneumatic tire 1 according to the embodiment is mounted on the rim 50 to be mounted to the vehicle 100. In this manner, the pneumatic tire 1 is disposed in the tire housing 101 of the vehicle 100. In this state, when the pneumatic tire 1 rotates in the rotation direction Y1, the vehicle 100 travels in the direction Y2. The protrusion portions 9 that rotate in the rotation direction Y1 when the vehicle 100 travels cause the air around the pneumatic tire 1 to be turbulent and minimize the above-mentioned air flow having low velocity. Then, as illustrated in FIG. 29, the air flow having low velocity is minimized, and a vortex generated from the tire housing 101 on the rear side of the pneumatic tire 1 in the advancement direction is subdivided. Then, the air pressure change becomes less significant along the side surface 102 of the vehicle 100, and the air along the side surface 102 of the vehicle 100 is rectified. As a result, the vehicle external noise, that is, pass-by noise, is reduced. As illustrated in FIG. 30, this function can be obtained with the inclination of the protrusion portions 9 being reversed with respect to the tire circumferential direction and the tire radial direction to that of FIG. 28.

Thus, in the pneumatic tire 1 according to present embodiment, the pass-by noise can further be reduced.

Incidentally, in the conventional pneumatic tire 11, an air flow from down to up is generated in the tire housing 101 so as to avoid the air flow having low velocity around the pneumatic tire 11. Accordingly, lift, which is a force that raises the vehicle 100 upward, is generated. Additionally, a bulge of air separating from the vehicle 100 is formed outside of the tire housing 101 so as to avoid the air flow having low velocity, thereby causing air resistance.

As a countermeasure to such phenomenon, according to the pneumatic tire 1 of the present embodiment, the protrusion portions 9 that rotate in the rotation direction Y1 when the vehicle 100 travels cause the air around the pneumatic tire 1 to be turbulent and minimize the above-mentioned air flow having low velocity. Specifically, at the lower portion of the pneumatic tire 1 when the pneumatic tire 1 is rotating (lower side of a rotation axis P), the speed of the air flowing past the bottom portion of the vehicle 100 is increased. This reduces the air flow from down to up in the tire housing 101, thus suppressing the air pressure upward. As a result, lift can be suppressed. Suppressing lift (lift reducing performance) results in an increase in downforce, an improvement in contact of the pneumatic tire 1 with the ground, and an improvement in steering stability performance, which is a measure of driving performance of the vehicle 100. Additionally, at the upper portion of the pneumatic tire 1 when the pneumatic tire 1 is rotating (upper side of the rotation axis P), a turbulent flow boundary layer is generated. This promotes the air flow around the pneumatic tire 1. As a result, the spread of the passing air is suppressed, so the air resistance of the pneumatic tire 1 can be reduced. Reducing the air resistance leads to an improvement in the fuel economy of the vehicle 100. As illustrated in FIG. 30, this function can be obtained with the inclination of the protrusion portions 9 being reversed with respect to the tire circumferential direction and the tire radial direction to that of FIG. 28.

Additionally, according to the pneumatic tire 1 of the present embodiment, by the ratio of the total width SW to the outer diameter OD satisfying the relationship SW/OD≤0.3, the total width is smaller and the outer diameter is greater than that of a typical pneumatic tire. Thus, rolling resistance and air resistance during travel can be reduced. While large diameter tires in particular tend to have increased air resistance caused by turbulent air flow not being generated due to a decrease in the relative speed between the side portion on the upper portion of the tire (upper position on the tire side portion S when the tire is mounted on a vehicle) and the air, the pneumatic tire 1 of the present embodiment includes the protrusion portion 9 as well as satisfies the relationship of the ratio of the total width SW to the outer diameter OD. Thus, the air flow at the side portion on the upper portion of the tire can be made turbulent, allowing an effect of reducing the air resistance to be maintained.

Additionally, according to the pneumatic tire 1 of the present embodiment, in the protrusion portion 9, the intermediate portion 9A in the extension direction that intersects the tire circumferential direction and the tire radial direction includes the highest position hH of projection height h from the tire side surface Sa, and the end portions 9B provided on either side of the intermediate portion 9A in the extension direction each include the lowest position hL of projection height h from the tire side surface Sa. Accordingly, the mass of the protrusion portion 9 is lower at the end portions 9B. As a result, a sudden change in mass from the tire side surface Sa at the area near the end portions 9B of the protrusion portion 9 is prevented, and hence durability of the protrusion portion 9 can be improved. At the same time, uniformity in the tire circumferential direction is improved, and hence and uniformity can be improved.

Thus, according to the pneumatic tire of the present embodiment, the pass-by noise, the air resistance, the lift can be reduced, the durability can be improved, and the uniformity can satisfactorily be maintained.

Further, in the pneumatic tire 1 of the present embodiment, the protrusion portion 9 is preferably disposed so that the highest position hH of the projection height h of the intermediate portion 9A is preferably in the range of 10% of the tire cross-sectional height from the tire maximum width position H to the inner side and the outer side in the tire radial direction.

According to the pneumatic tire 1, the highest position hH of the projection height h of the intermediate portion 9A is disposed closer to the tire maximum width position H. Accordingly, the function of minimizing the above-mentioned air flow having low velocity by causing the air around to be turbulent becomes significant. As a result, the effect of reducing the pass-by noise and the effect of reducing the lift can be obtained more significantly.

Additionally, in the pneumatic tire 1 of the present embodiment, the protrusion portion 9 preferably has the intermediate portion 9A having the projection height h ranging from 2 mm to 10 mm.

When the projection height h of the intermediate portion 9A is smaller than 2 mm, it is difficult to obtain the above-mentioned function of minimizing the air flow having low velocity. When the projection height h of the intermediate portion 9A is greater than 10 mm, the amount of air flow colliding with the protrusion portion 9 is increased. As a result, air resistance is liable to increase. Thus, to obtain the effect of significantly reducing pass-by noise and air resistance, the projection height h of the intermediate portion 9A preferably ranges from 2 mm to 10 mm.

Additionally, as illustrated in FIG. 5, in the pneumatic tire 1 of the present embodiment, the change in mass of the protrusion portion 9 in the tire circumferential direction per 1 degree in the tire circumferential direction sectioned from the rotation axis P in the tire radial direction is preferably 1 mm/degree or less.

According to the pneumatic tire 1, by specifying the change in mass of the projection height h of the protrusion portion 9 in the tire circumferential direction, wind noise generated due to change in shape of the protrusion portion 9 is capable of being suppressed. Accordingly, with the wind noise, the noise generated from the protrusion portion 9 can be reduced. In addition, according to the pneumatic tire 1, by specifying the change in mass of the protrusion portion 9 in the tire circumferential direction, uniformity in the tire circumferential direction is improved. As a result, the effect of significantly improving uniformity can be obtained.

Additionally, as illustrated in FIG. 5, in the pneumatic tire 1 of the present embodiment, the change in mass of the protrusion portion 9 in the tire circumferential direction per 1 degree in the tire circumferential direction sectioned from the rotation axis Pin the tire radial direction is preferably 0.1 g/degree or less.

According to the pneumatic tire 1, by specifying the change in mass of the protrusion portion 9 in the tire circumferential direction, change in mass of the protrusion portion 9 is capable of being suppressed. Accordingly, vibration generated along with the rotation of the pneumatic tire 1 can be suppressed. With this vibration, the noise generated from the protrusion portion 9 can be reduced. In addition, according to the pneumatic tire 1, by specifying the change in mass of the protrusion portion 9 in the tire circumferential direction, uniformity in the tire circumferential direction is improved. As a result, the effect of significantly improving uniformity can be obtained.

Also, in the pneumatic tire 1 according to the embodiment, as illustrated in FIG. 5, the angle α of the protrusion portion 9 with respect to the tire radial direction with the end on the inner side in the tire radial direction as a reference point on the outer side in the tire radial direction preferably satisfies the range of from 15° to 85°.

According to the pneumatic tire 1, when the angle α is greater than 15°, the orientation of the air resistance caused on the protrusion portion positioned on the right side or the left side viewed from the tire shaft can be shifted from the tire advancement direction. Thus, the air resistance can be reduced. Meanwhile, when the angle α is smaller than 85°, the orientation of the air resistance caused on the protrusion portion positioned on the upper side or the lower side viewed from the tire shaft can be shifted from the tire advancement direction. Thus, the air resistance can be reduced.

Further, as illustrated in FIGS. 31 to 33, in the pneumatic tire 1 of the present embodiment, a groove 9E is preferably formed in the surface of the protrusion portion 9.

According to the pneumatic tire 1, by the groove 9E being formed, the rigidity of the protrusion portion 9 is decreased. As a result, a decrease in ride comfort due to the tire side portion S being made a rigid structure by the protrusion portions 9 can be suppressed. Additionally, by the groove 9E being formed, the mass of the protrusion portion 9 is decreased. As a result, the uniformity of the tire side portion S can be suppressed by the protrusion portion 9.

Note that as illustrated in FIG. 31, a plurality of the grooves 9E are provided at predetermined intervals with respect to the length L so as to intersect the extension direction of the protrusion portion 9. An angle β at which the grooves 9E intersect the extension direction of the protrusion portion 9 is not particularly specified. However, the grooves 9E preferably have the same angle β so that an extreme change in mass of the protrusion portion 9 in the extension direction is suppressed. As illustrated in FIG. 33, the grooves 9E preferably have the same angle θ (for example, θ=90°) with respect to a tangent line GL of a center line SL that passes through the center of the protrusion portion 9 in the lateral direction so that an extreme change in mass of the protrusion portion 9 in the extension direction is suppressed. The grooves 9E preferably have a groove width of 2 mm or less so that they have little aerodynamic influence, that is, their influence on the effect of minimizing the air flow having low velocity by causing the air around to be turbulent, increasing the air flow past the bottom portion of the vehicle 100, and generating a turbulent flow boundary layer is minimal. As illustrated in FIG. 32, the grooves 9E preferably have a groove depth d1 that is equal to or less than the projection height h of the protrusion portion 9 so that the protrusion portion 9 is not divided partway along the protrusion portion 9, and the effect of minimizing the air flow having low velocity by causing the air around to be turbulent, increasing the air flow past the bottom portion of the vehicle 100, and generating a turbulent flow boundary layer can be obtained. The groove depth d1 of the grooves 9E is, for example, preferably equal to or less than 90% of the projection height h of the protrusion portion 9. Note that the triangular shape of the protrusion portion 9 as viewed in a cross section in the lateral direction in FIG. 32 is merely an example.

Further, as illustrated in FIGS. 34 and 35, in the pneumatic tire 1 of the present embodiment, a recessed portion 9F is preferably formed in the surface of the protrusion portion 9.

According to the pneumatic tire 1, by the recessed portion 9F being formed, the rigidity of the protrusion portion 9 is decreased. As a result, a decrease in ride comfort due to the tire side portion S being made a rigid structure by the protrusion portions 9 can be suppressed. Additionally, by the recessed portion 9F being formed, the mass of the protrusion portion 9 is decreased. As a result, a decrease in uniformity due to the protrusion portions 9 increasing the mass of the tire side portion S can be suppressed.

Note that as illustrated in FIG. 34, a plurality of the recessed portions 9F are provided at predetermined intervals in the extension direction of the protrusion portion 9. In embodiments in which the width W of the protrusion portion 9 changes in the extension direction, the recessed portions 9F preferably changes in size according to the change in the width W so that an extreme change in mass of the protrusion portion 9 in the extension direction is suppressed. The recessed portions 9F preferably have an opening diameter of 2 mm or less so that they have little aerodynamic influence, that is, their influence on the effect of minimizing the air flow having low velocity by causing the air around to be turbulent, increasing the air flow past the bottom portion of the vehicle 100, and generating a turbulent flow boundary layer is minimal. As illustrated in FIG. 35, the recessed portions 9F preferably have a groove depth d2 that is equal to or less than the projection height h of the protrusion portion 9 so that the protrusion portion 9 is not divided partway along the protrusion portion 9, and the effect of minimizing the air flow having low velocity by causing the air around to be turbulent, increasing the air flow past the bottom portion of the vehicle 100, and generating a turbulent flow boundary layer can be obtained. The groove depth d2 of the recessed portions 9F is, for example, preferably equal to or less than 90% of the projection height h of the protrusion portion 9. Note that the triangular shape of the protrusion portion 9 as viewed in a cross section in the lateral direction in FIG. 35 is merely an example. Additionally, the position where the recessed portions 9F are provided is not limited to the top portion of the protrusion portion 9 and may be on a side portion. The opening shape and depth shape of the recessed portion 9F are not limited to a circular shape and may be various shapes. However, the opening edge and the bottom portion are preferably arcuate so that there are no elements prone to generating cracks in the protrusion portion 9.

As illustrated in FIG. 36, in the pneumatic tire 1 of the present embodiment, the grooves 9E and the recessed portions 9F are preferably formed in the surface of the protrusion portion 9.

According to the pneumatic tire 1, by the grooves 9E and the recessed portion 9F being formed, the rigidity of the protrusion portion 9 is decreased. As a result, a decrease in ride comfort due to the tire side portion S being made a rigid structure by the protrusion portions 9 can be suppressed. Additionally, by the grooves 9E and the recessed portion 9F being formed, the mass of the protrusion portion 9 is decreased. As a result, a decrease in uniformity due to the protrusion portions 9 increasing the mass of the tire side portion S can be suppressed.

Note that in FIG. 36, the grooves 9E and the recessed portions 9F are provided alternately in the extension direction of the protrusion portion 9, however, no such limitation is intended and they may be disposed in an appropriate mixed manner.

In the pneumatic tire 1 of the present embodiment, the protrusion portions 9 are preferably disposed at non-uniform intervals in the tire circumferential direction.

According to the pneumatic tire 1, by counteracting the periodicity of the protrusion portions 9 in the tire circumferential direction related to the air flow along the tire side surface Sa of the tire side portion S, the difference in frequency causes the sound pressure generated by the protrusion portions 9 to be dispersed and offset. As a result, noise (sound pressure level) generated in the pneumatic tire 1 can be reduced.

Note that the intervals of the protrusion portions 9, as viewed from the side of the pneumatic tire 1, are taken as angles between auxiliary lines (not illustrated) of the protrusion portions 9, the auxiliary lines being drawn from the rotation axis P to the ends 9D of the protrusion portions 9 in the tire radial direction. Additionally, to make the intervals between the protrusion portions 9 non-uniform, a variety of measures can be performed by, for example, making the protrusion portions 9 each have the same shape (projection height h, width W, and length L in the extension direction) and the same inclination at which the protrusion portions 9 intersect the tire circumferential direction and the tire radial direction while changing the pitch in the tire circumferential direction, changing the shape (projection height h, width W, and length L in the extension direction), and changing the inclination at which the protrusion portions 9 intersect the tire circumferential direction and the tire radial direction.

Figure 10:
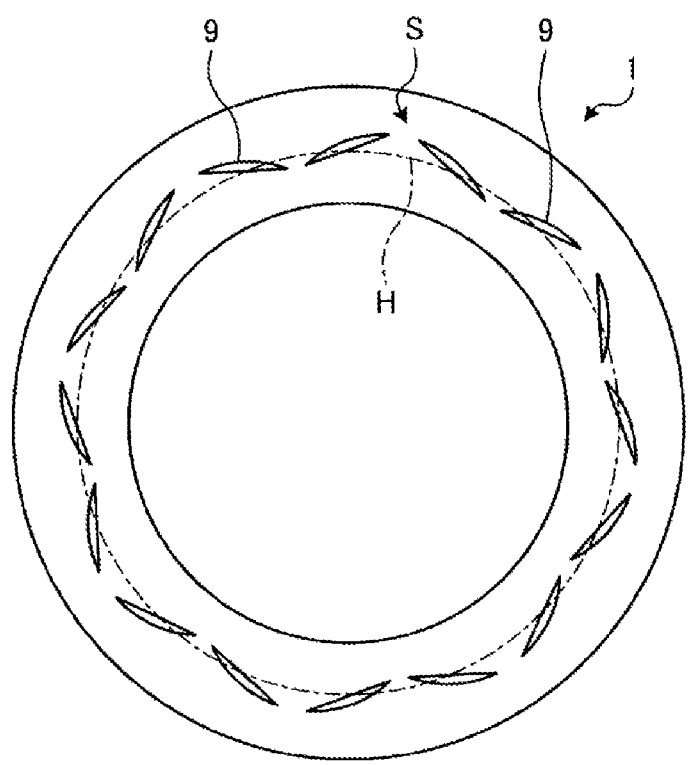
FIG. 10 is a side view of another example of a pneumatic tire according to an embodiment of the present technology.
Figure 11:
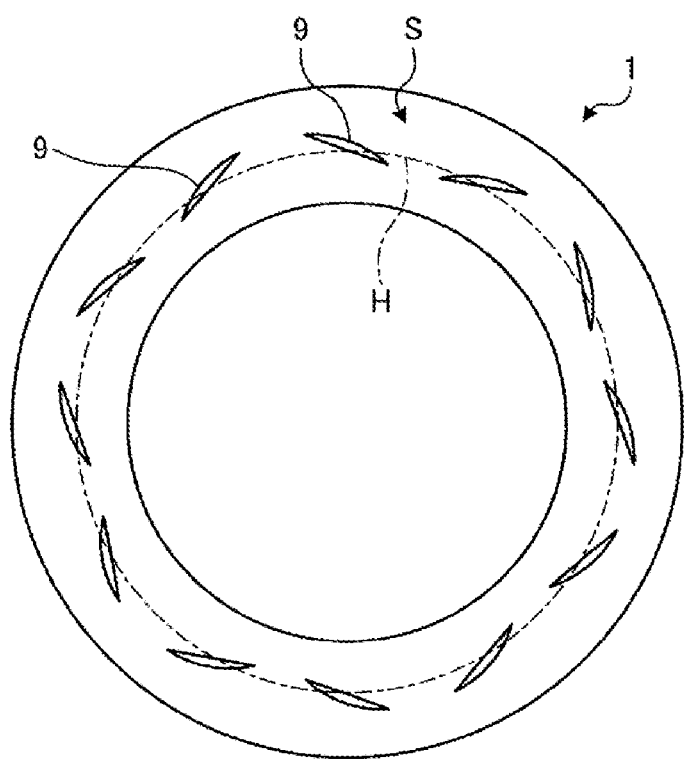
FIG. 11 is a side view of another example of a pneumatic tire according to an embodiment of the present technology.
Figure 12:
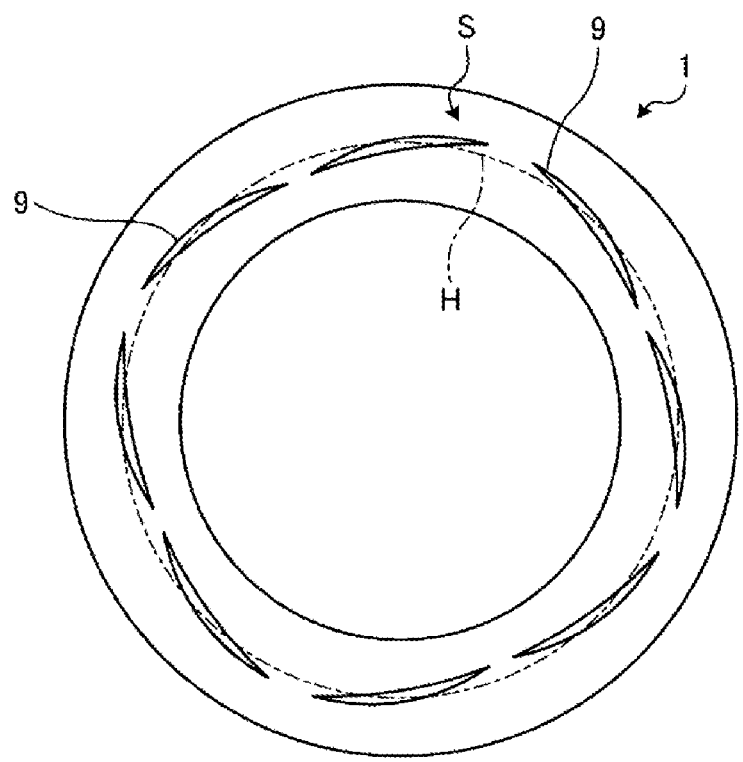
FIG. 12 is a side view of another example of a pneumatic tire according to an embodiment of the present technology.
Figure 13:
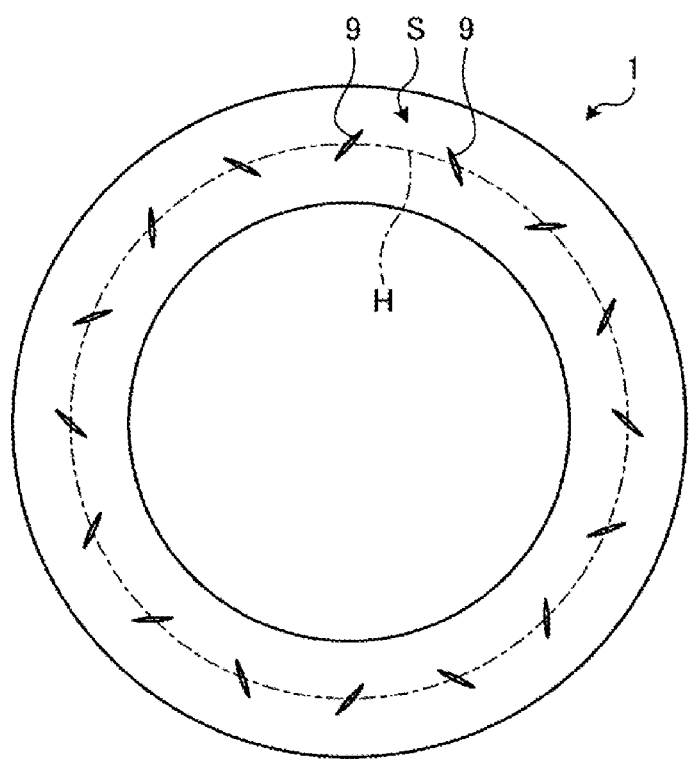
FIG. 13 is a side view of another example of a pneumatic tire according to an embodiment of the present technology.

Also, as illustrated in FIGS. 10 and 13, preferably, the protrusion portions 9 adjacent to each other in the tire circumferential direction have inclination angles having different numerical symbols with respect to the tire circumferential direction.

The inclination angle of the protrusion portion 9 with respect to the tire circumferential direction is an angle formed between the extension direction (L) of the protrusion portion 9 and the tangent line in the tire circumferential direction, and the protrusion portions 9 adjacent to each other in the tire circumferential direction have the inclination angles reciprocal to each other. With this structure, rotation directionality at the time of mounting to the vehicle is eliminated, and hence convenience can be improved.

Furthermore, the pneumatic tire 1 of the present embodiment preferably has a designated vehicle inner/outer side orientation when mounted on a vehicle, and the protrusion portions 9 are preferably formed on at least the tire side portion S corresponding to the vehicle outer side.

In other words, when the pneumatic tire 1 of the present embodiment is mounted on the vehicle 100 (see FIGS. 28 and 30), the orientation with respect to the inner side and the outer side of the vehicle 100 in the tire lateral direction is designated. The orientation designations, while not illustrated in the drawings, for example, can be shown via indicators provided on the sidewall portions 4. Therefore, the side facing the inner side of the vehicle 100 when mounted on the vehicle 100 is the "vehicle inner side", and the side facing the outer side of the vehicle 100 is the "vehicle outer side". Note that the designations of the vehicle inner side and the vehicle outer side are not limited to cases when mounted on the vehicle 100. For example, in cases in which the pneumatic tire 1 is mounted on a rim, the orientation of the rim 50 (see FIGS. 28 and 30) with respect to the inner side and the outer side of the vehicle 100 in the tire lateral direction is predetermined. Thus, in cases in which the pneumatic tire 1 is mounted on a rim, the orientation with respect to the vehicle inner side and the vehicle outer side in the tire lateral direction is designated.

The tire side portion S on the vehicle outer side is exposed outward from the tire housing 101 when the pneumatic tire 1 is mounted on the vehicle 100. Thus, by the protrusion portions 9 being provided on the tire side portion S on the vehicle outer side, the air flow can be pushed in the vehicle outer side direction. This allows the effect of significantly subdividing the vortex generated from the tire housing 101 on the rear side of the pneumatic tire 1 in the advancement direction. Then, the air pressure change becomes less significant along the side surface 102 of the vehicle 100, and the air along the side surface 102 of the vehicle 100 is rectified. This allows the effect of significantly reducing the pass-by noise to be obtained.

Note that in the pneumatic tire 1 of the embodiment described above, the protrusion portion 9 preferably has the width W in the lateral direction ranging from 0.5 mm to 10.0 mm. When the width W of the protrusion portion 9 in the lateral direction is less than the range described above, the area of the protrusion portion 9 in contact with the air flow is small. This makes the effect of the protrusion portions 9 improving the slow air flow difficult to obtain. When the width W of the protrusion portion 9 in the lateral direction is greater than the range described above, the area of the protrusion portion 9 in contact with the air flow is great. This causes the protrusion portions 9 to increase the air resistance and increase the tire weight. Thus, by appropriately setting the width W of the protrusion portion 9 in the lateral direction, the effect of the protrusion portions 9 significantly improving the slow air flow can be obtained.

Additionally, the pitch of the protrusion portions 9 in the tire circumferential direction may be the same as or different from the pitch of lug grooves in the tread portion 2 in the tire circumferential direction. By the pitch of the protrusion portions 9 in the tire circumferential direction being different from the pitch of the lug grooves in the tread portion 2 in the tire circumferential direction, sound pressure generated from the protrusion portions 9 and sound pressure from the lug grooves are dispersed and counteract one another due to the difference in frequency. As a result, pattern noise generated by the lug grooves can be reduced. Note that the lug grooves with a different pitch than the protrusion portions 9 in the tire circumferential direction include all of the lug grooves in the rib-like land portions 23 defined in the tire lateral direction by the main grooves 22. However, to obtain the effect of significantly reducing the pattern noise generated by the lug grooves, the pitch of the protrusion portions 9 in the tire circumferential direction is preferably different from the pitch of the laterally outermost lug grooves disposed nearest the protrusion portions 9.

EXAMPLES

For the examples, tests for pass-by noise reducing performance, lift reducing performance, air resistance reducing performance, uniformity, protrusion portion durability performance, and ride comfort performance were performed on various types of pneumatic tires under different conditions (see FIGS. 37A-37B and 38A-38B).

In the tests for pass-by noise reducing performance, the test tires having a tire size of 195/65R15 were mounted on a regular rim (15×6J) and inflated to the regular internal pressure. Further, the test tires were mounted to test vehicles (cars with motor assist), and the pass-by noise (vehicle external noise) was measured when the test vehicles traveled on a test course with the ISO road surface at the speed of 50 km/h. The measurements are expressed as index values with the measurement value (pass-by noise dB) of a Conventional Example being defined as the reference (100). In the evaluation, larger index values indicate smaller pass-by noise and superior pass-by noise reducing performance.

In the tests for lift reducing performance and air resistance reducing performance, a wind tunnel simulation test was run using a vehicle model with tire models having a tire size of 195/65R15 mounted on a body model of a motor assist passenger vehicle. The travel speed was set to the equivalent of 80 km/h. Using fluid analysis software using Lattice Boltzmann methods utilizing the drag coefficient, the aerodynamic characteristics (lift reducing performance and air resistance reducing performance) were obtained. The evaluation results are expressed as index values based on the obtained results with the results of Conventional Example being defined as the reference (100). In the evaluation, larger values indicate superior lift reducing performance and air resistance reducing performance.

Then, as for the uniformity test, the test tires were measured for radial force variation (RFV) in accordance with the method specified in JASO (Japanese Automotive Standards Organization) C607 for tire uniformity, which is "Test Procedures for Automobile Tire Uniformity". The measurement results are expressed as index values and evaluated with Conventional Example being defined as the reference (100). In the evaluation, larger index scores indicate superior uniformity.

In the tests for protrusion portion durability performance, using an indoor drum durability test, the test tires were rotated for a predetermined period of time at a speed of 240 km/h, while monitoring the state of the protrusion portions (generation of a crack or breakage). The measurement results are expressed as index values and evaluated with Conventional Example being defined as the reference (100). In the evaluation, larger index values indicate lower risk of generation of a crack and breakage and superior protrusion portion durability performance.

In the tests for ride comfort performance, the test tires were mounted on the test vehicle, and the test vehicle was driven at 50 km/h on a straight test course with undulations of 10 mm in height, and three members of a panel conducted a feeling test for riding comfort. In the evaluation, the average values of three test results are expressed as index values with the result of Conventional Example being defined as the reference (100). In the evaluation, larger index values indicate superior ride comfort performance.

Figure 39:
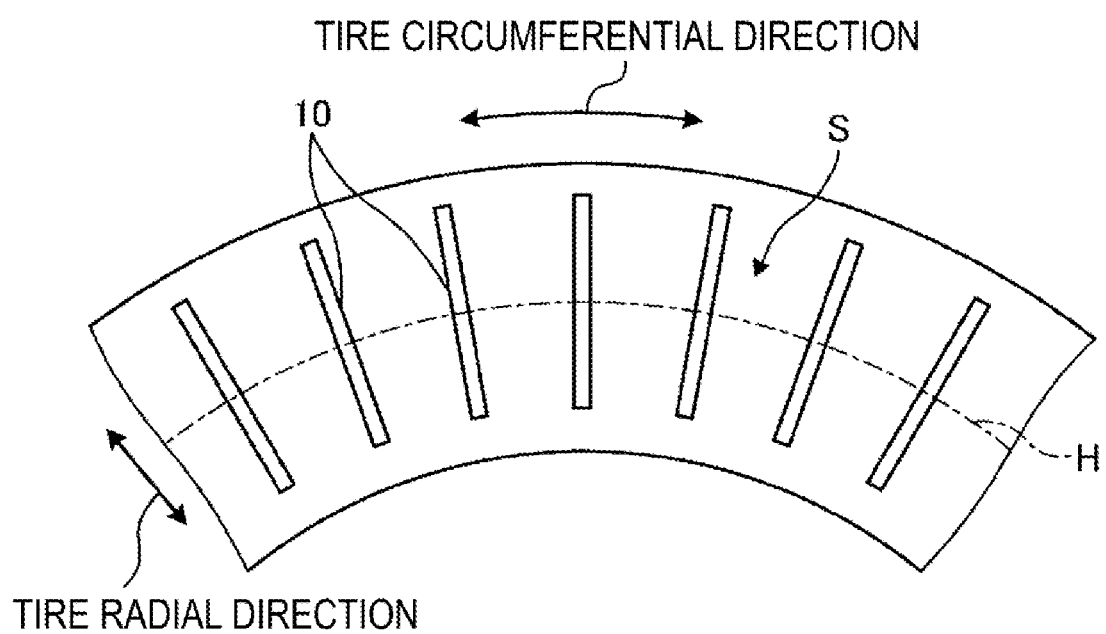
FIG. 39 is a side view of a portion of a pneumatic tire according to a Conventional Example.

In reference to FIGS. 37A-37B, the pneumatic tire of Conventional Example has the ratio SW/OD of the total width SW to the outer diameter OD of 0.33, has the configuration illustrated in FIG. 39, and includes a protrusion portion 10 provided on the tire side portion S. The protrusion portion 10 has the triangular shape as viewed in a cross section in the lateral direction illustrated in FIG. 15, extends in the tire radial direction, has uniform projection height and width in the lateral direction in the extension direction, disposed in a direction that intersects the tire maximum width position H, and is disposed at equal intervals in the tire circumferential direction.

Additionally, in reference to FIGS. 37A-37B, the pneumatic tire of Comparative Example 1 has the ratio SW/OD of the total width SW to the outer diameter OD of 0.24, but protrusion portions similar to that of Conventional Example are provided. The pneumatic tire of Comparative Example 2 has the configuration illustrated in FIG. 5 and includes the protrusion portion illustrated in FIG. 7 with a triangular shape as viewed in a cross section in the lateral direction of the protrusion portion illustrated in FIG. 15; however the ratio SW/OD of the total width SW to the outer diameter OD is 0.33.

Figure 15:
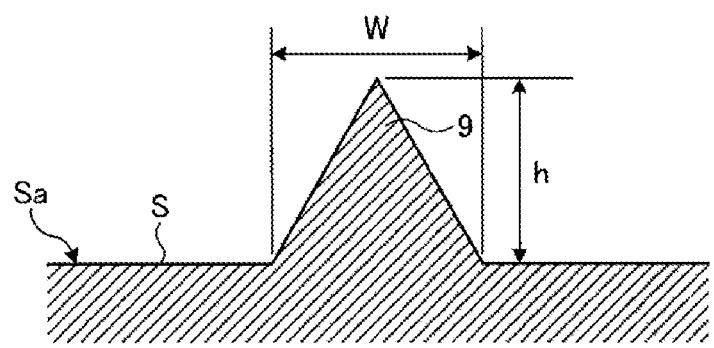
FIG. 15 is a cross-sectional view in a lateral direction of a protrusion portion.
Figure 16:
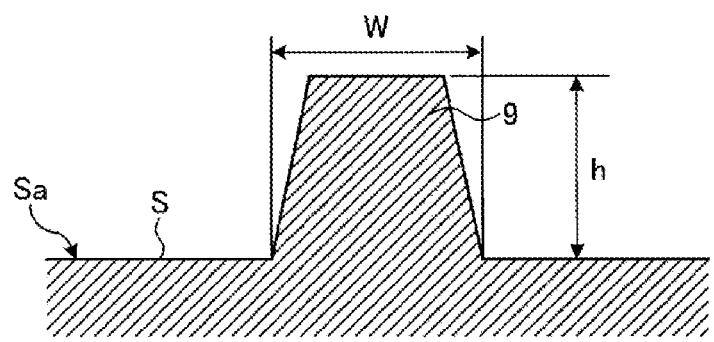
FIG. 16 is a cross-sectional view in a lateral direction of a protrusion portion.
Figure 17:
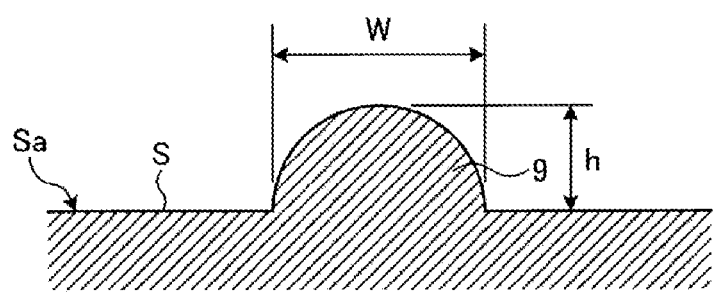
FIG. 17 is a cross-sectional view in a lateral direction of a protrusion portion.

Also in FIGS. 34 and 38A-38B, the pneumatic tires of Examples 1 to 15 have the ratio SW/OD of the total width SW to the outer diameter OD of 0.24, have the configuration illustrated in FIG. 5, and include the protrusion portion illustrated in FIG. 7 with a triangular shape as viewed in a cross section in the lateral direction of the protrusion portion illustrated in FIG. 15. The pneumatic tire of Example 16 has the configuration illustrated in FIG. 10 and includes the protrusion portion illustrated in FIG. 7 with a triangular shape as viewed in a cross section in the lateral direction of the protrusion portion illustrated in FIG. 15. Further, in the pneumatic tires of Examples 1 and 2, the protrusion portion is disposed so that the highest position of the projection height of the intermediate portion is in the range of 20% of the tire cross-sectional height from the tire maximum width position to the inner side and the outer side in the tire radial direction. In the pneumatic tires of Examples 3 to 16, the protrusion portion is disposed so that the highest position of the projection height of the intermediate portion is in the range of 10% of the tire cross-sectional height from the tire maximum width position to the inner side and the outer side in the tire radial direction. In other aspects, the examples are specified as appropriate.

As seen in the test results of FIGS. 37A-37B and 38A-38B, in the pneumatic tires of Examples, pass-by noise reducing performance, lift reducing performance, air resistance reducing performance, uniformity, and protrusion portion durability performance, and ride comfort performance are improved.

The invention claimed is:

1. A pneumatic tire, comprising:
a plurality of protrusion portions extending along a tire side surface of a tire side portion in a direction that intersects a tire circumferential direction and a tire radial direction;
the plurality of protrusion portions each including
an intermediate portion in an extension direction that includes a highest position of projection height from the tire side surface, and
an end portion on either side of the intermediate portion in the extension direction that includes a lowest position of projection height from the tire side surface;
the highest position of projection height of the intermediate portion is in a range of 20% of a tire cross-sectional height from a tire maximum width position to an inner side and an outer side in the tire radial direction; and
a ratio of a total width SW and an outer diameter OD satisfies a relationship of SW/OD≤0.30; wherein
the intermediate portion is defined as a portion in a range of 25% of a length L of the protrusion portion in the extension direction from a center on either side in the extension direction,
the end portion extends from the intermediate portion on both sides in the extension direction excluding 5% of the length of the protrusion portion from ends of the protrusion portion in the extension direction,
the lowest position of the end portion is at a position 5% of the length L of the protrusion portion from the ends of the protrusion portion,
the projection height of the protrusion portion at the lowest position is smaller than the projection height of the protrusion portion at the highest position,
the protrusion portion extends from the highest position to the lowest position and has an arc shape that is convex to the tire outside when viewed from a side of the protrusion portion,
the tire maximum width position is located at a position of the tire side portion in the tire radial direction between a rim check line and a shoulder portion of the pneumatic tire outward in a tire lateral direction of a tread edge, and the tire side portion refers to a surface that uniformly continues from a ground contact edge of the tread portion outward in the tire lateral direction and a range from a rim check line outward in the tire radial direction, and
the end portion on one side of the protrusion portion extends further radially inward from the inner side of the range of 20% of a tire cross-sectional height from the tire maximum width position and the end portion on the other side of the protrusion portion extends further radially outward from the outer side of the range of 20% of a tire cross-sectional height from the tire maximum width position.

2. The pneumatic tire according to claim 1, wherein the protrusion portion is disposed so that the highest position of projection height of the intermediate portion is in a range of 10% of the tire cross-sectional height from the tire maximum width position to the inner side and the outer side in the tire radial direction.

3. The pneumatic tire according to claim 2, wherein the intermediate portion of the protrusion portion has a projection height ranging from 2 mm to 10 mm.

4. The pneumatic tire according to claim 3, wherein a change in mass of projection height of the protrusion portion in the tire circumferential direction per 1 degree in the tire circumferential direction is 1 mm/degree or less.

5. The pneumatic tire according to claim 4, wherein a change in mass of the protrusion portion in the tire circumferential direction per 1 degree in the tire circumferential direction is 0.1 g/degree or less.

6. The pneumatic tire according to claim 5, wherein an angle of the protrusion portion with respect to the tire radial direction with the end on the inner side in the tire radial direction as a reference point on the outer side in the tire radial direction is from 15° to 85°.

7. The pneumatic tire according to claim 6, wherein a groove is formed on a surface of the protrusion portion.

8. The pneumatic tire according to claim 7, wherein a recessed portion is formed on the surface of the protrusion portion.

9. The pneumatic tire according to claim 8, wherein the plurality of protrusion portions are disposed in the tire circumferential direction at non-uniform intervals.

10. The pneumatic tire according to claim 9, wherein the protrusion portions adjacent to each other in the tire circumferential direction have inclination angles having different numerical symbols with respect to the tire circumferential direction.

11. The pneumatic tire according to claim 10, wherein a vehicle inner/outer side orientation when the pneumatic tire is mounted on a vehicle is designated, and the plurality of protrusion portions are at least formed on a tire side portion that corresponds to a vehicle outer side.

12. The pneumatic tire according to claim 1, wherein the intermediate portion of the protrusion portion has a projection height ranging from 2 mm to 10 mm.

13. The pneumatic tire according to claim 1, wherein a change in mass of projection height of the protrusion portion in the tire circumferential direction per 1 degree in the tire circumferential direction is 1 mm/degree or less.

14. The pneumatic tire according to claim 1, wherein a change in mass of the protrusion portion in the tire circumferential direction per 1 degree in the tire circumferential direction is 0.1 g/degree or less.

15. The pneumatic tire according to claim 1, wherein an angle of the protrusion portion with respect to the tire radial direction with the end on the inner side in the tire radial direction as a reference point on the outer side in the tire radial direction is from 15° to 85°.

16. The pneumatic tire according to claim 1, wherein a groove is formed on a surface of the protrusion portion.

17. The pneumatic tire according to claim 1, wherein a recessed portion is formed on the surface of the protrusion portion.

18. The pneumatic tire according to claim 1, wherein the plurality of protrusion portions are disposed in the tire circumferential direction at non-uniform intervals.

19. The pneumatic tire according to claim 1, wherein the protrusion portions adjacent to each other in the tire circumferential direction have inclination angles having different numerical symbols with respect to the tire circumferential direction.

20. The pneumatic tire according to claim 1, wherein a vehicle inner/outer side orientation when the pneumatic tire is mounted on a vehicle is designated, and the plurality of protrusion portions are at least formed on a tire side portion that corresponds to a vehicle outer side.

21. The pneumatic tire according to claim 1, wherein the protrusion portions extend primarily in the tire circumferential direction.

22. The pneumatic tire according to claim 1, wherein the protrusion portions do not overlap each other in view of the tire radial direction.

23. A pneumatic tire, comprising:
a plurality of protrusion portions extending along a tire side surface of a tire side portion in a direction that intersects a tire circumferential direction and a tire radial direction;
the plurality of protrusion portions each including
an intermediate portion in an extension direction that includes a highest position of projection height from the tire side surface, and
an end portion on either side of the intermediate portion in the extension direction that includes a lowest position of projection height from the tire side surface;
the highest position of projection height of the intermediate portion is in a range of 20% of a tire cross-sectional height from a tire maximum width position to an inner side and an outer side in the tire radial direction; and
a ratio of a total width SW and an outer diameter OD satisfies a relationship of SW/OD≤0.3; wherein
the intermediate portion is defined as a portion in a range of 25% of a length L of the protrusion portion in the extension direction from a center on either side in the extension direction,
the end portion extends from the intermediate portion on both sides in the extension direction excluding 5% of the length of the protrusion portion from ends of the protrusion portion in the extension direction,
the lowest position of the end portion is at a position 5% of the length L of the protrusion portion from the ends of the protrusion portion,
the projection height of the protrusion portion at the lowest position is smaller than the projection height of the protrusion portion at the highest position,
the protrusion portion extends from the highest position to the lowest position and has an arc shape that is convex to the tire outside when viewed from a side of the protrusion portion, and
the protrusion portions adjacent to each other in the tire circumferential direction have inclination angles having different numerical symbols with respect to the tire circumferential direction.

24. The pneumatic tire according to claim 23, wherein the protrusion portion intersects the tire maximum width position.

25. A pneumatic tire, comprising:
a plurality of protrusion portions extending along a tire side surface of a tire side portion in a direction that intersects a tire circumferential direction and a tire radial direction;
the plurality of protrusion portions each including
an intermediate portion in an extension direction that includes a highest position of projection height from the tire side surface, and
an end portion on either side of the intermediate portion in the extension direction that includes a lowest position of projection height from the tire side surface;
the highest position of projection height of the intermediate portion is in a range of 20% of a tire cross-sectional height from a tire maximum width position to an inner side and an outer side in the tire radial direction; and
a ratio of a total width SW and an outer diameter OD satisfies a relationship of SW/OD≤0.3; wherein
the intermediate portion is defined as a portion in a range of 25% of a length L of the protrusion portion in the extension direction from a center on either side in the extension direction,
the end portion extends from the intermediate portion on both sides in the extension direction excluding 5% of the length of the protrusion portion from ends of the protrusion portion in the extension direction,
the lowest position of the end portion is at a position 5% of the length L of the protrusion portion from the ends of the protrusion portion, the projection height of the protrusion portion at the lowest position is smaller than the projection height of the protrusion portion at the highest position, the protrusion portion extends from the highest position to the lowest position and has an arc shape that is convex to the tire outside when viewed from a side of the protrusion portion, and the protrusion portion has an arc shape that is convex outward in the tire radial direction in a plan view of the tire side portion.

* * * * *